United States Patent
Someya et al.

(10) Patent No.: US 9,583,124 B2
(45) Date of Patent: Feb. 28, 2017

(54) HEAD ASSEMBLY AND MAGNETIC DISK DEVICE

(71) Applicant: TDK CORPORATION, Tokyo (JP)

(72) Inventors: Taku Someya, Tokyo (JP); Hideki Kuwajima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/069,467

(22) Filed: Mar. 14, 2016

(65) Prior Publication Data

US 2016/0267929 A1 Sep. 15, 2016

(30) Foreign Application Priority Data

Mar. 13, 2015 (JP) .................................. 2015-050232
Dec. 21, 2015 (JP) .................................. 2015-248120

(51) Int. Cl.
G11B 5/48 (2006.01)

(52) U.S. Cl.
CPC ............. *G11B 5/483* (2015.09); *G11B 5/4833* (2013.01); *G11B 5/484* (2013.01)

(58) Field of Classification Search
None
See application file for complete search history.

(56) References Cited

U.S. PATENT DOCUMENTS

| 8,780,501 B2 | 7/2014 | Kuwajima |
| 2011/0211274 A1 | 9/2011 | Kuwajima |
| 2012/0287536 A1 | 11/2012 | Kuwajima |

FOREIGN PATENT DOCUMENTS

| JP | 2003263851 A | * | 9/2003 |
| JP | 2007257824 A | * | 10/2007 |
| JP | 2011138596 A | | 7/2011 |
| JP | 5360129 B2 | | 12/2013 |
| JP | 2014059940 A | * | 4/2014 |

* cited by examiner

*Primary Examiner* — Will J Klimowicz
(74) *Attorney, Agent, or Firm* — Oliff PLC

(57) ABSTRACT

Head assembly and magnetic disk device, wherein reaction force induced by warpage of driving element during operation can be decreased and unnecessary resonance can be suppressed, in addition, displacement amount of head element can be efficiently obtained. A head assembly includes first buffering part connecting first reinforcing part and first displacement transferring part with flexural rigidity lower than those of first reinforcing part and first displacement transferring part; second buffering part connecting second reinforcing part and main part of flexure with flexural rigidity lower than those of second reinforcing part and main part of flexure; third buffering part connecting third reinforcing part and second displacement transferring part with flexural rigidity lower than those of third reinforcing part and second displacement transferring part; and fourth buffering part connecting fourth reinforcing part and main part of flexure with flexural rigidity lower than those of fourth reinforcing part and main part of flexure.

16 Claims, 14 Drawing Sheets

HEAD ASSEMBLY AND MAGNETIC DISK DEVICE

The present invention relates to a head assembly and a magnetic disk device which contain a head rotating mechanism such as a micro actuator to provide a higher recording density to the magnetic disk device used in the storage device and the like in a computer.

BACKGROUND

In recent years, the recording density in the magnetic disk arranged in the magnetic disk device is being gradually developed to be higher. A slider is disposed in the magnetic disk device, wherein the slider is provided with a head used for the record and reproduction of data in the magnetic disk and is supported by a head assembly.

The head assembly is provided on a head actuator arm to form a head actuator arm which is rotatable by a voice coil motor (VCM). With VCM, the head provided on the slider can be controlled and located on any position of the magnetic disk.

However, in order to record the data in the magnetic disk in a higher density, it is necessary to highly precisely locate the head in the magnetic disk. Even if the head actuator arm is rotated through only VCM to locate the head, the location of the head in high precision is not enabled.

For instance, Patent Document 1 has disclosed the entire configuration of a head assembly having a conventional head rotating mechanism. The thin film piezoelectric element is bonded to the flexure disposed on the front end part of the head assembly. If the voltage is applied to the thin film piezoelectric element, the thin film piezoelectric element expands and contracts. Thereby, the slider rotates around the support projection and the head is displaced in a micro scale to be precisely located in the track.

In addition, a technical is proposed in Patent Document 2 that a counter balance is disposed in the symmetry axis of the gimbal part so as to improve the resonance frequency characteristic and also to perform the location in a high speed, wherein the gimbal supports the slider in such a manner that the slider is enabled to rotate around the support projection in a free style.

PATENT DOCUMENTS

Patent Document 1:JP-A-2011-138596
Patent Document 2:JP-P5360129

SUMMARY

However, as described in the technique disclosed in Patent Document 1, when the driving element for providing the slider with the rotary force is a thin film piezoelectric element, reaction force is generated in the vertical direction in the driving element due to the warpage of the driving element, wherein the warpage of the driving element is generated from the displacement difference between the thin film piezoelectric element which displaces as expanding and contracting under the applied voltage and the front end part of the head assembly, on which the thin film piezoelectric element is bonded, since the front end part is composed as a part of the flexure that does not expand or contract. Improvement can be made in several respects such as the resonance of load beam being excited by the reaction force at the resonance frequency.

On the other hand, in Patent Document 2, the inertial mass of the rotating part can be set the minimum level by matching the gravity center of the gimbal part which contains the slider to the support projection which is the rotary center. Further, as the inherent frequency of the load beam is not excited with the reaction force from the rotating part, unnecessary vibration in the load beam is suppressed. However, similar to Patent Document 1, further improvement can be made in terms of the suppression on the unnecessary resonance in the load beam induced by the reaction force due to warpage of the driving element.

The present invention is made in view of the conditions mentioned above. It aims to provide a head assembly and a magnetic disk device, wherein the reaction force induced by warpage of the driving element during its operation can be decreased and unnecessary resonance can be suppressed. In addition, the displacement amount of the head element can be effectively obtained.

The head assembly of the present invention is characterized in that it is provided with a slider supporting plate which is disposed in a flexure containing a flexure board and on which a slider having a head element is supported rotatably around a support projection arranged on the front end part of a load beam; a first driving element and a second driving element for providing the slider supporting plate with a rotary force along its plane; a first displacement transferring part for transferring the driving force from the first driving element to the slider supporting plate; a second displacement transferring part for transferring the driving force from the second driving element to the slider supporting plate; a first driving element-supporting part for supporting the first driving element; a second driving element-supporting part for supporting the second driving element. The first driving element-supporting part is provided with a first and a second reinforcing part disposed at both ends of the first driving element; a first buffering part connecting the first reinforcing part and the first displacement transferring part with its flexural rigidity being lower than those of the first reinforcing part and the first displacement transferring part; and a second buffering part connecting the second reinforcing part and the main part of the flexure with its flexural rigidity being lower than those of the second reinforcing part and the main part of the flexure. The second driving element-supporting part is provided with a third and a fourth reinforcing part disposed at both ends of the second driving element; a third buffering part connecting the third reinforcing part and the second displacement transferring part with its flexural rigidity being lower than those of the third reinforcing part and the second displacement transferring part; and a fourth buffering part connecting the fourth reinforcing part and the main part of the flexure with its flexural rigidity being lower than those of the fourth reinforcing part and the main part of the flexure.

According to the present invention, the first driving element-supporting part is provided with the first and the second reinforcing part disposed at both ends of the first driving element; the first buffering part connecting the first reinforcing part and the first displacement transferring part with its flexural rigidity being lower than those of the first reinforcing part and the first displacement transferring part; the second buffering part connecting the second reinforcing part and the main part of the flexure with its flexural rigidity being lower than those of the second reinforcing part and the main part of the flexure. The second driving element-supporting part is provided with the third and the fourth reinforcing part disposed at both ends of the second driving element; the third buffering part connecting the third reinforcing part and the second displacement transferring part with its flexural rigidity being lower than those of the third reinforcing part and the second displacement transferring part; the fourth buffering part connecting the fourth reinforcing part and the main part of the flexure with its flexural rigidity being lower than those of the fourth reinforcing part and the main part of the flexure. Thus, with the first buffering part to the fourth buffering part with a low flexural rigidity, the reaction force due to the warpage of the first and second driving element during the operation can be decreased. Therefore, when the reaction force in the vertical direction in the first and second driving element is decreased, unnecessary resonance can be suppressed. In addition, when the reaction force due to the warpage of the first and second driving element in the vertical direction in these driving elements are decreased, the driving force from the first and second driving element is transferred in the in-plane direction and the displacement amount of the head element can be amplified. As a result, the displacement amount of the head element can be effectively obtained.

The following configuration is preferable. That is, the first buffering part and the third buffering part comprise the head element wiring part which transmits signals to the head element; the second buffering part and the fourth buffering part comprise the driving element wiring part which transmits signals to the first driving element and the second driving element; the first displacement transferring part and the first reinforcing part as well as the second displacement transferring part and the third reinforcing part have the reinforcing plate for partially reinforcing the head element wiring part; and the second reinforcing part and the fourth reinforcing part have the reinforcing plate for partially reinforcing the driving element wiring part. With such a configuration, the reaction force induced by the warpage of the first and second driving elements can be absorbed by the first to fourth buffering parts with a low flexural rigidity. Since the reaction force induced by the warpage of the first and second driving elements in the vertical direction is decreased, unnecessary resonance is suppressed and the displacement amount of the head element can be amplified. Further, as the first to fourth buffering parts can be processed and formed during the formation of the head element wiring part and the driving element wiring part, no new step is needed. Also, unnecessary resonance can be suppressed and the displacement amount of the head element can be amplified.

The following configuration is preferable. That is, the length of the first buffering part in the direction connecting the first reinforcing part and the first displacement transferring part is equal to the length of the second buffering part in the direction connecting the second reinforcing part and the main part of the flexure, and the length of the third buffering part in the direction connecting the third reinforcing part and the second displacement transferring part is equal to the length of the fourth buffering part in the direction connecting the fourth reinforcing part and the main part of the flexure. With such a configuration, the reaction force due to the warpage of the first and second driving elements in the vertical direction is divided and applied equally to the first and second displacement transferring part and also the main part of the flexure, and the reaction force can be effectively decreased. Thus, the unnecessary resonance can be further suppressed and the displacement amount of the head element can be further amplified.

The following configuration is preferable. That is, the first buffering part and the second buffering part have the same configuration and have the shape showing the point symmetry around the center of the first driving element or the line symmetry around the central line of the first driving element, and the third buffering part and the fourth buffering part have the same configuration and have the shape showing the point symmetry around the center of the second driving element or the line symmetry around the central line of the second driving element. With such a configuration, the reaction force due to the warpage of the first and second driving elements in the vertical direction is divided and applied equally to the first and second displacement transferring parts and also the main part of the flexure, and the reaction force can be effectively decreased. Thus, the unnecessary resonance can be further suppressed and the displacement amount of the head element can be further amplified.

The magnetic disk device of the present invention is characterized in that it is provided with the head assembly mentioned above. According to the present invention, the reaction force induced by the warpage of the driving element during its operation can be decreased, and the unnecessary resonance can be suppressed. Further, a magnetic disk device having the head assembly can be provided, wherein the displacement amount of the head element can be effectively obtained.

According to the present invention, a head assembly and a magnetic disk device can be provided in which the reaction force induced by the warpage of the driving element during its operation can be decreased, the unnecessary resonance can be suppressed, and the displacement amount of the head element can be effectively obtained.

BRIEF DESCRIPTION OF THE DRAWINGS

FIG. 5b shows the cross-section taken along A-A line in FIG. 5a.

FIG. 5c shows the cross-section taken along B-B line in FIG. 5a.

DETAILED DESCRIPTION OF EMBODIMENTS

Hereinafter, the preferable embodiments of the present invention will be described with reference to the drawings. The present invention is not limited to the following embodiments. In addition, the structural component described below includes those easily thought of by those skilled in the art and those substantially the same with the described ones. Also, the structural elements described below can be properly used in combination. Further, to omit or replace or change some structural elements is possible without departing from the spirit and scope of the present invention.

Figure 1:
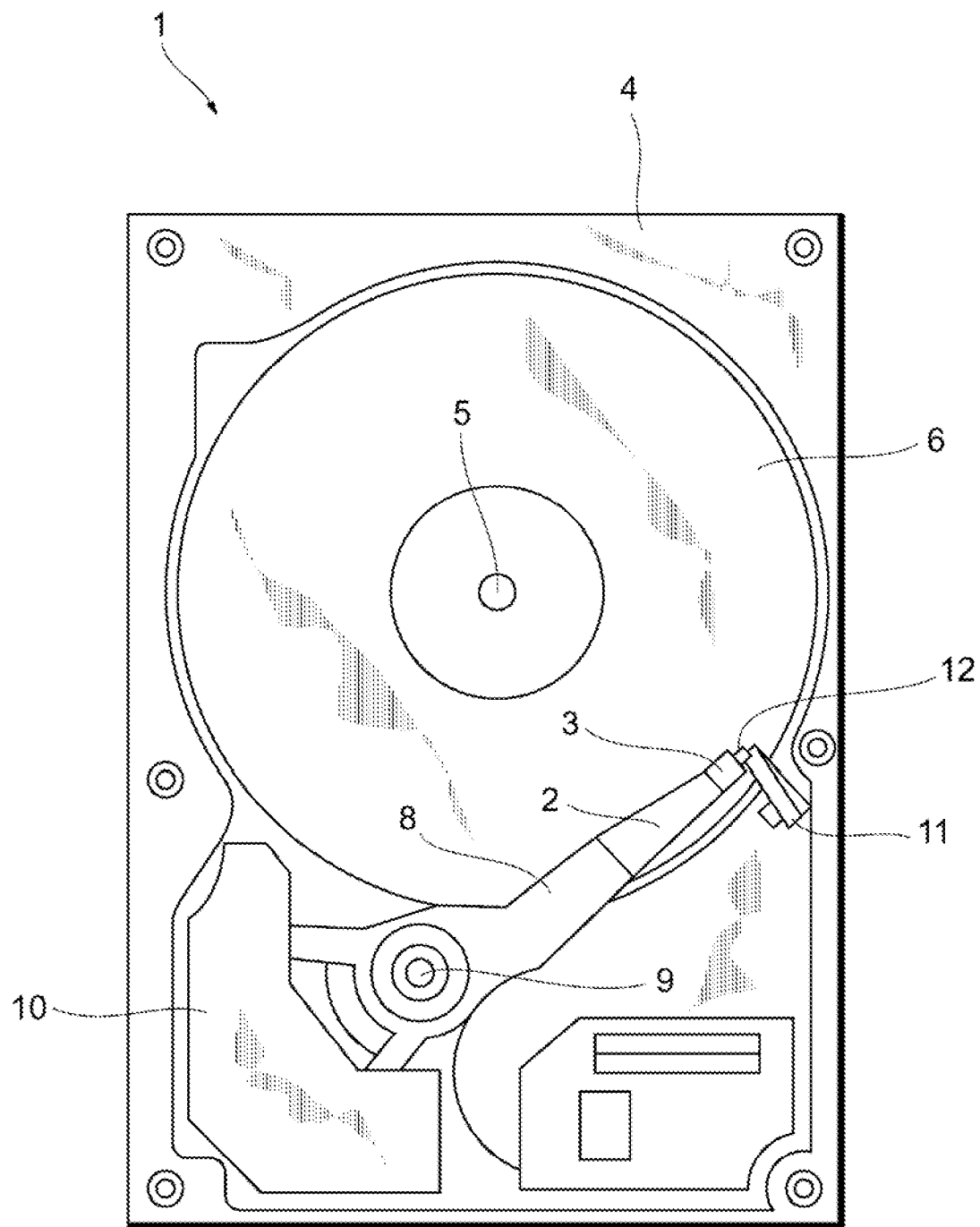
FIG. 1 is a schematic view showing the entire configuration of the magnetic disk device with the loading/unloading manner which is provided with the head assembly according to a preferable embodiment of the present invention.

FIG. 1 is a view schematically showing the entire configuration of the magnetic disk device (HDD device) with the loading/unloading manner which is provided with the head assembly according to a preferable embodiment of the present invention. According to FIG. 1, magnetic disk device 1 consists of housing 4, magnetic disk 6 being driven by a spindle motor to rotate around axis 5, head assembly 2 provided with slider 3 at its front end part, and supporting arm 8 for supporting head assembly 2 at its front end part, wherein slider 3 contains head element 7.

A coil part of a voice coil motor (VCM) (not shown) is arranged at the rear end part of supporting arm 8. Supporting arm 8 can rotate around horizontal rotating axis 9 in parallel to the surface of magnetic disk 6. The VCM comprises the coil part and magnet part 10 which covers the coil part. Ramp mechanism 11 is arranged from the outside of the data region of magnetic disk 6 to the outside of magnetic disk 6, tab 12 disposed at the forefront of head assembly 2 is run upon its inclined surface so as to separate slider 3 from magnetic disk 6 to provide the unloading state.

During the operation of magnetic disk device 1 (rotation of magnetic disk in a high speed), slider 3 faces the surface of magnetic disk 6 and floats over the surface with a minor gap therebetween to turn into the loading state. On the other hand, when magnetic disk device 1 is not being operated (the magnetic disk staying still or rotating in a low speed when it is to be started or stopped), tab 12 at the forefront of head assembly 2 is located on ramp mechanism 11 and thus slider 3 is in the unloading state.

Figure 2:
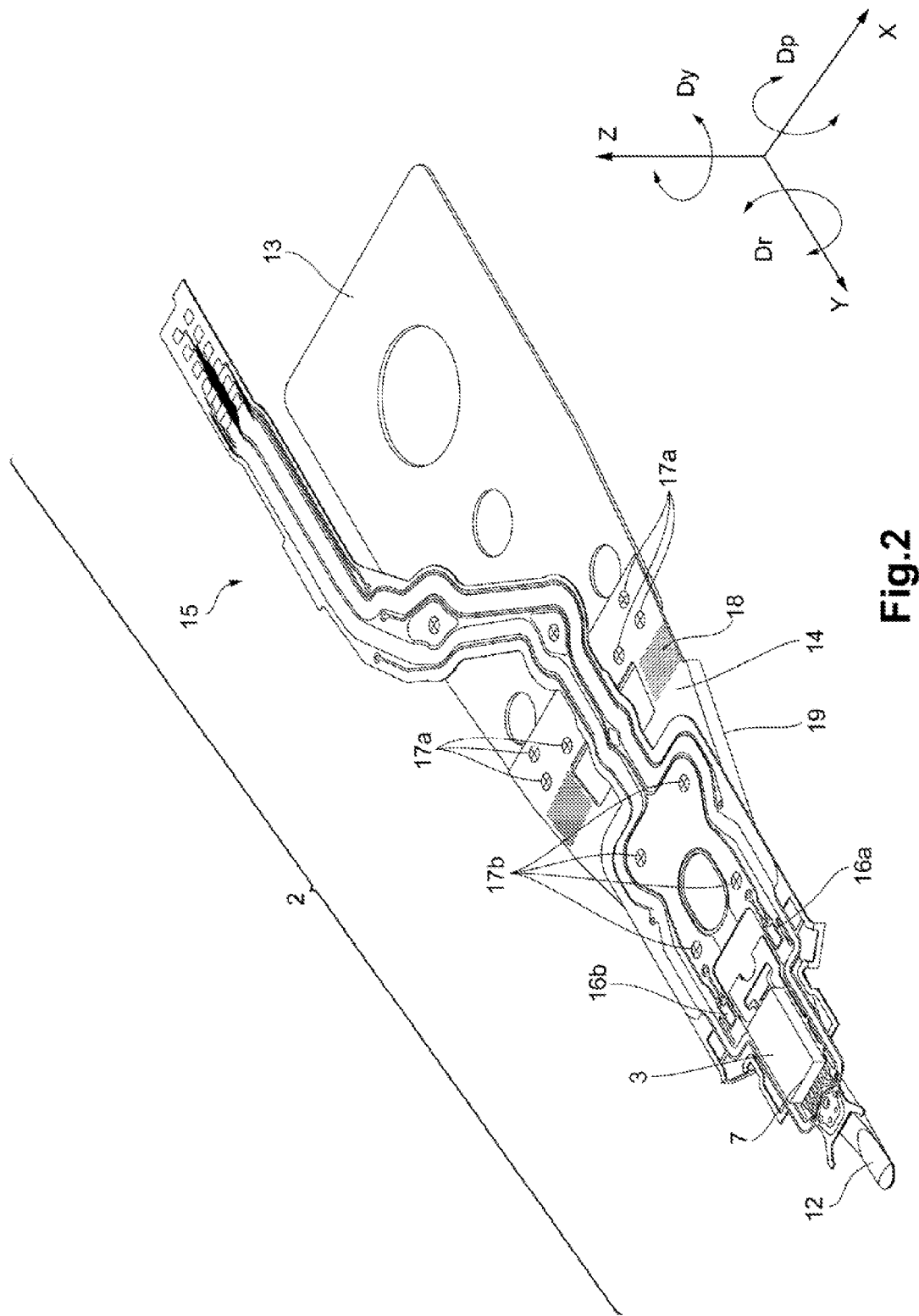
FIG. 2 is a perspective view schematically showing the entire configuration of the head assembly according to a preferable embodiment of the present invention.

FIG. 2 is a perspective view schematically showing the entire configuration of the head assembly according to a preferable embodiment of the present invention. Hereinafter, for the convenience of description, the positive direction of Z axis as shown in the drawings is referred to the upper side of head assembly 2, and the negative direction of Z axis is referred to as rear side or lower side of head assembly 2. Slider 3 has head element 7 at its rear end plane (trailing edge, at the positive direction of Y axis in FIG. 2), and head element 7 consists of an inductive recording head element, and a MR (magneto resistance) reading thin film head such as a reading head element with giant magneto resistance (GMR) or a reading head element with tunneling magneto resistance (TMR).

According to FIG. 2, head assembly 2 is provided with base plate 13, load beam 14, flexure 15, driving element 16 and slider 3 as the main structural components. In addition, base plate 13 is arranged on the front end part of supporting arm 8.

According to FIG. 2, load beam 14 is bonded to base plate 13 via several first beam welding points 17a. In addition, blade spring 18 is disposed on load beam 14 and functions in such a manner that slider 3 provides the load to the disk surface of the recording medium (i.e., the subject for recording information). In load beam 14, bend processing parts 19 are disposed at both sides to enhance the strength. Flexure 15 is fixed to load beam 14 via several second beam welding points 17b. In FIG. 2, with respect to the attitude angles of slider 3, Dp represents the pitch direction, and Dr and Dy represent the roll direction and Yaw direction, respectively.

Figure 3:
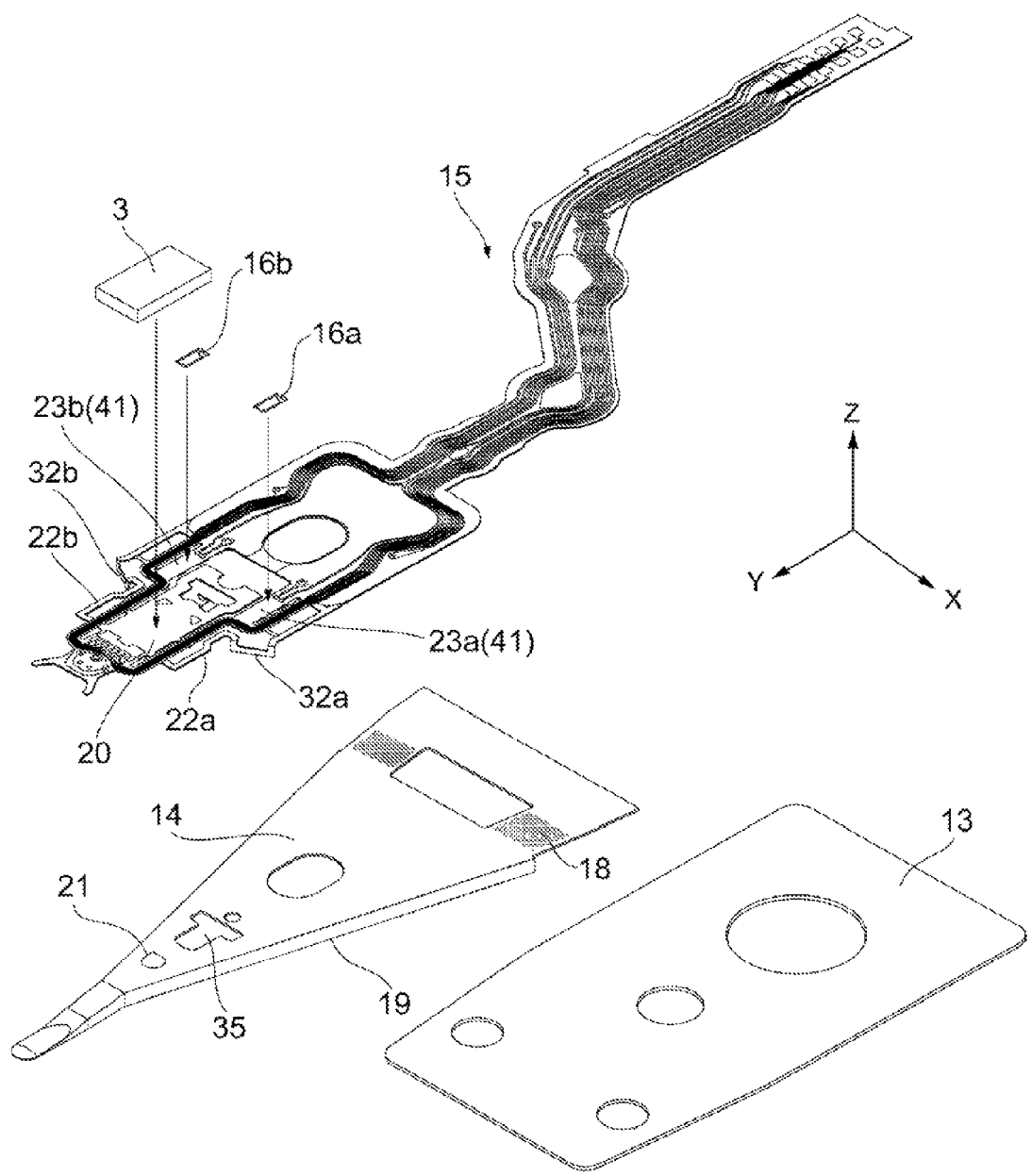
FIG. 3 is an exploded perspective view schematically showing the configuration of the head assembly according to a preferable embodiment of the present invention.
Figure 4:
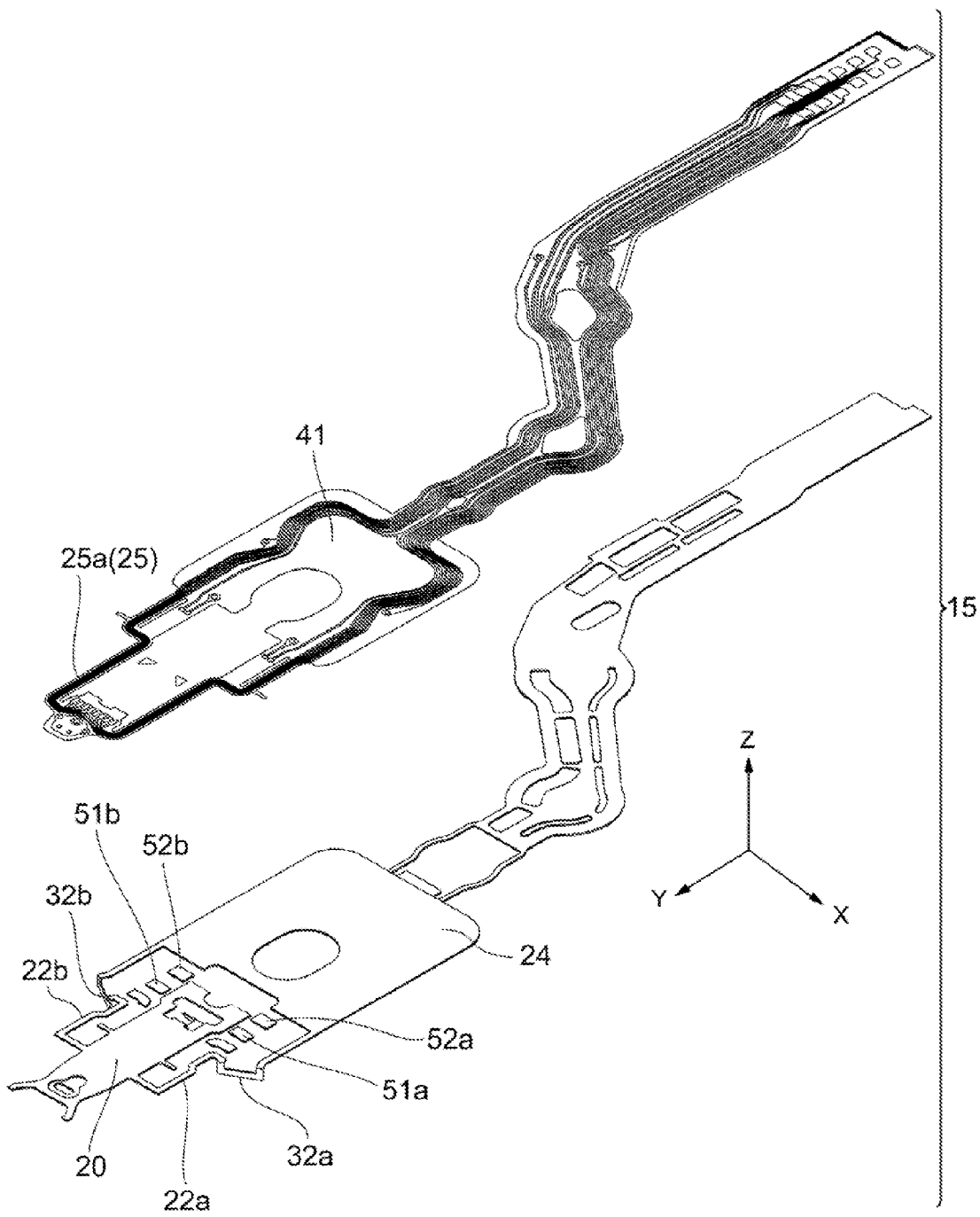
FIG. 4 is an exploded perspective view showing the configuration of the flexure according to a preferable embodiment of the present embodiment.

FIG. 3 is an exploded perspective view schematically showing the head assembly according to a preferable embodiment of the present invention. FIG. 4 is an exploded perspective view showing the configuration of the flexure according to a preferable embodiment of the present invention. In FIG. 3, a state is provided that head assembly 2 has been divided into base plate 13, load beam 14, flexure 15, driving means 16 and slider 3.

According to FIG. 3, slider 3 is bonded and fixed to slider supporting plate 20 which is disposed on flexure 15. Support projection 21 is integratedly projected and formed on the central line near the front end part of load beam 14. Support projection 21 is formed in a pivot like structure and contacts with slider supporting plate 20 in a point, wherein slider supporting plate 20 is supported by first outrigger 22a and second outrigger 22b. As such, slider 3 floats smoothly in response to the fluctuation on the disk surface. In other words, slider supporting plate 20 supports slider 3 in such a manner that it can rotate freely around support projection 21.

Flexure 15 is generally composed of the flexible wiring board. The flexible wiring board is formed by laminating insulating layer 41 and conductor foils 25 on flexure board 24, which is composed of a thin stainless steel plate of approximately 20 μm and has elasticity. On insulating layer 41, head element wiring 25a (head element wiring part) is formed with conductor foils 25 by laminating material plated with copper foil. Here, flexure board 24 and the flexible wiring board containing head element wiring 25a can be precisely processed into any optional shapes by etching so as to provide the external shape and the wiring structure. Further, for better understanding, the integrated flexure 15 is divided into flexure board 24 made of stainless steel and head element wiring 25a (head element wiring part) disposed on insulating layer 41 as separately shown in FIG. 4.

Driving element 16 is a thin film piezoelectric element and functions to provide a rotary force to slider supporting plate 20 along its plane. In particular, driving element 16 consists of first driving means 16a (the first driving element) and second driving means 16b (the second driving element) which are bonded on and supported by first driving element-supporting part 23a and second driving element-supporting part 23b, respectively. In addition, first driving element-supporting part 23a and second driving element-supporting part 23b comprise insulating layer 41 only, wherein insulating layer 41 is used to form flexure 15.

Figure 5A:
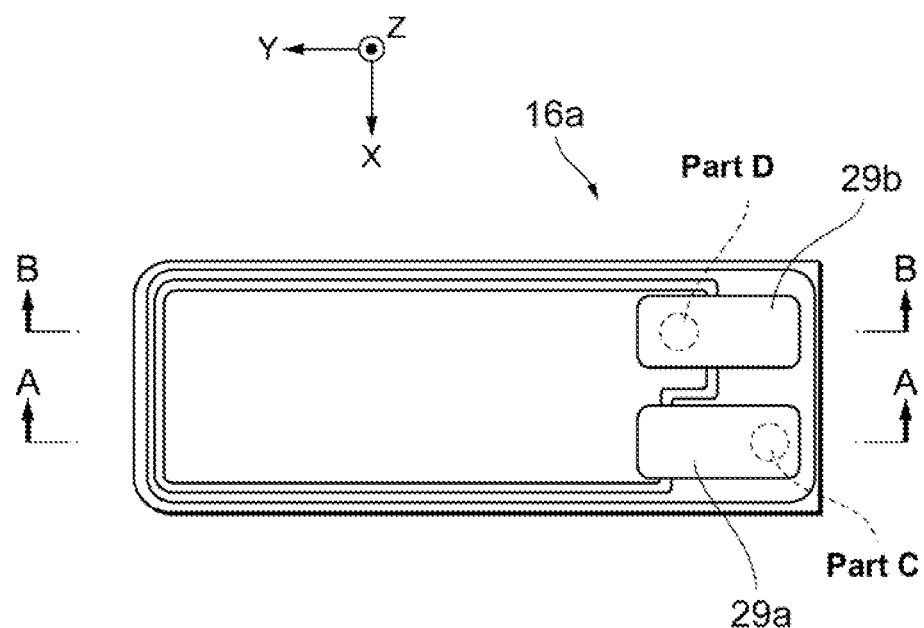
FIG. 5a is a plan view showing the first driving means having the head assembly according to a preferable embodiment of the present invention.
Figure 5B:
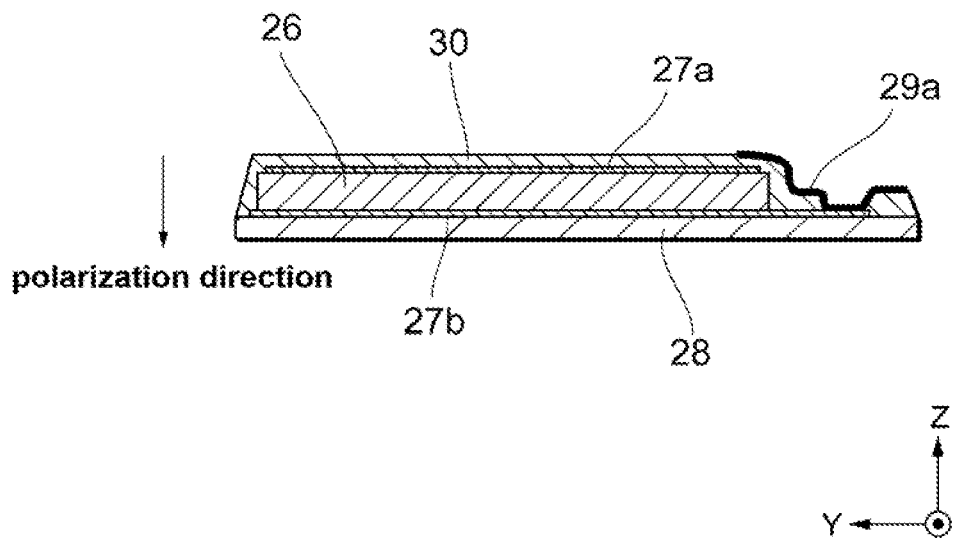
Figure 5C:
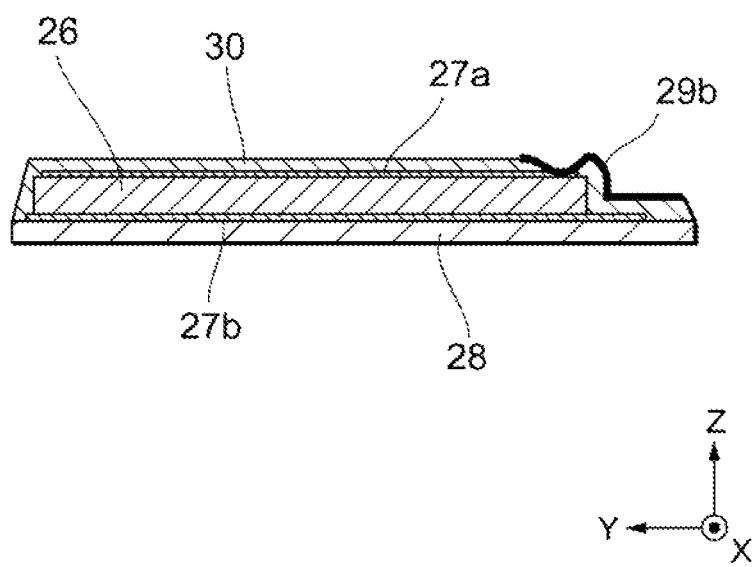

FIG. 5a is a plan view showing the first driving means provided in the head assembly according to a preferable embodiment of the present invention. FIG. 5b shows the cross-section taken along A-A line in FIG. 5a, and FIG. 5c shows the cross-section taken along B-B line in FIG. 5a. Further, as the configuration of first driving means 16a is the same as that of second driving means 16b, only the configuration of first driving means 16a is described here. First driving means 16a is manufactured by disposing upper electrode 27a on the upper side of thin film piezoelectric 26 and disposing lower electrode 27b on the lower side. Since first driving means 16a is very thin and easy to break, base 28 is arranged as the reinforcing material.

In first driving means 16a, in order to protect thin film piezoelectric 26, the whole element is covered by insulating cover 30 made of polyimide. In addition, part of insulating cover 30 is removed at part C and part D in FIG. 5a. In particular, at part C, lower electrode 27b is exposed and connected with first electrode pad 29a. Similarly, at part D, upper electrode 27a is exposed and connected with second electrode pad 29b. In this way, when the voltage is applied to first electrode pad 29a and second electrode pad 29b, thin film piezoelectric 26 inside first driving means 16a can expand and contract. The arrow indicates the polarization direction of thin film piezoelectric 26. If a negative voltage is applied to first electrode pad 29a and a positive voltage is applied to second electrode pad 29b, thin film piezoelectric 26 contracts in the in-plane direction of the piezoelectric thin film with piezoelectric constant d31. On the other hand, as for second driving means 16b having the same configuration with first driving means 16a, although it is not shown in the drawings, thin film piezoelectric 26 contracts in the in-plane direction of the piezoelectric thin film with piezoelectric constant d31 if a negative voltage is applied to third electrode pad 29c (which corresponds to first electrode pad 29a) and a positive voltage is applied to fourth electrode pad 29d (which corresponds to second electrode pad 29b).

Figure 6:
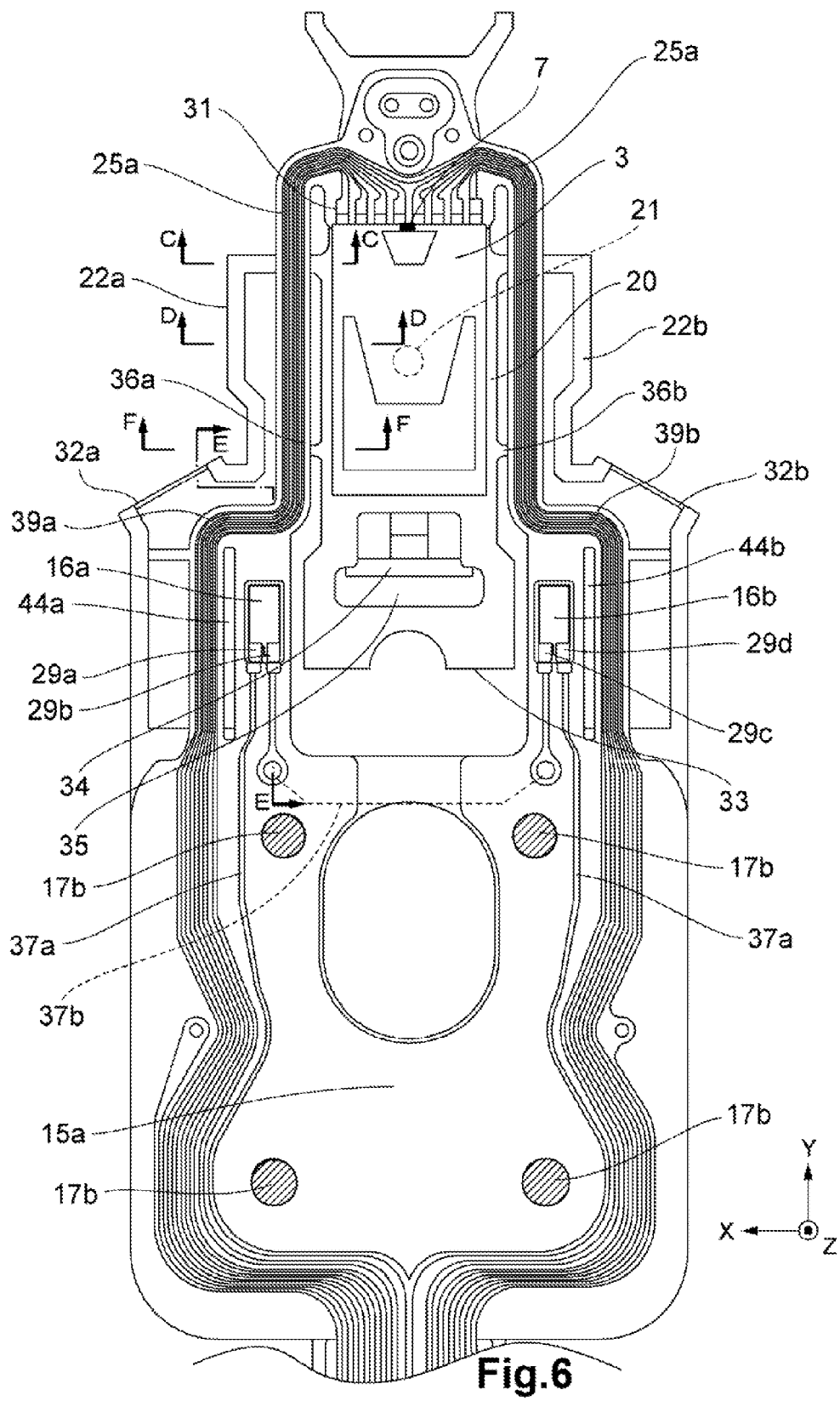
FIG. 6 is a plan view showing the main part of the front end of the head assembly according to a preferable embodiment of the present invention when viewed from the upper side.
Figure 7:
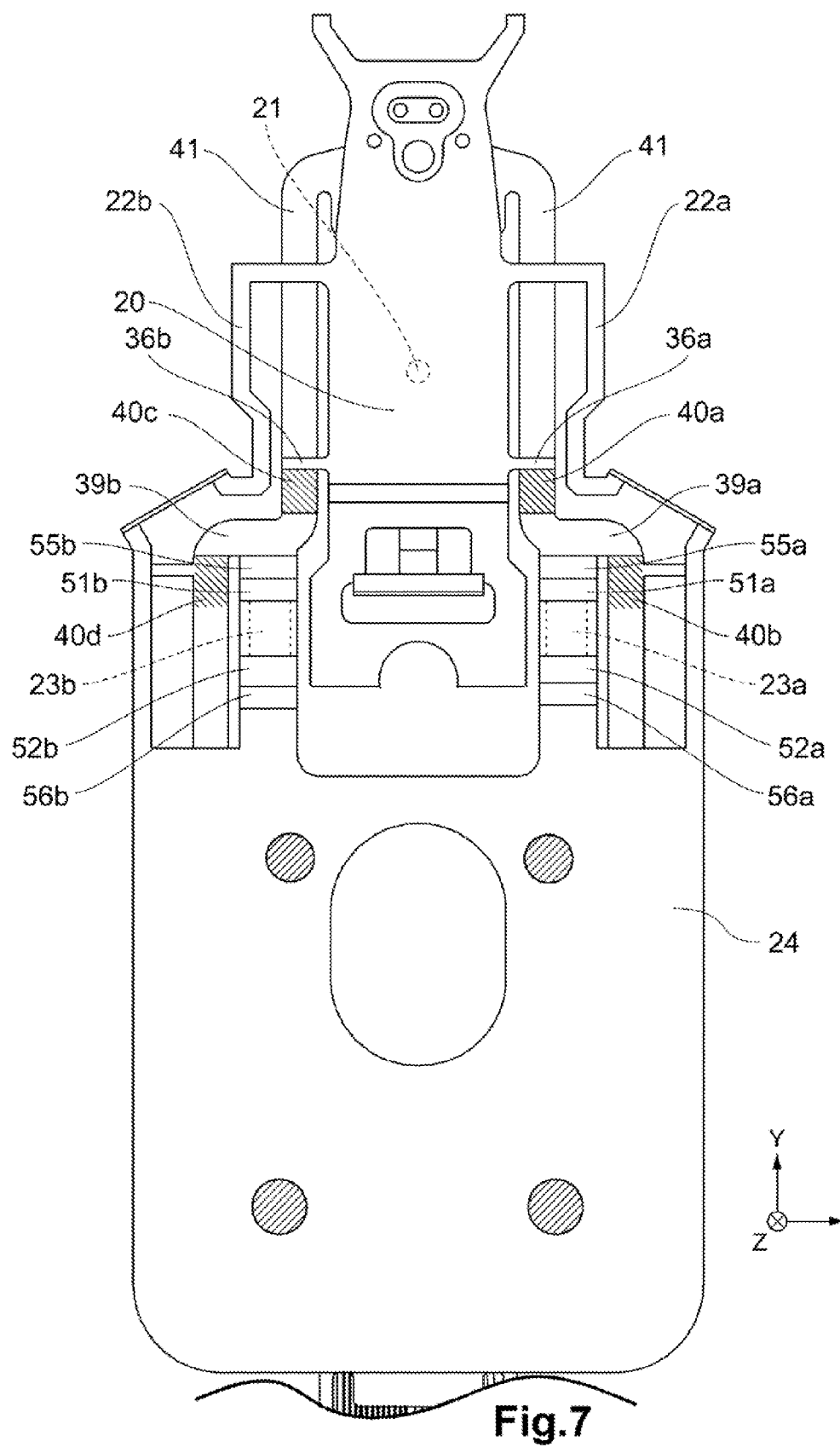
FIG. 7 a plan view showing the main part of the front end of the head assembly according to a preferable embodiment of the present invention when viewed from the lower side.

FIG. 6 is a plan view showing the main part of the front end of the head assembly according to a preferable embodiment of the present invention when viewed from the upper side (the side where slider is located). FIG. 7 is a plan view showing the main part of the front end of the head assembly according to a preferable embodiment of the present invention when viewed from the lower side (i.e., when the plan view of FIG. 6 showing the head assembly is viewed from the rear side). For convenient description, load beam 14 is not shown in these figures. Slider 3 is bonded to slider supporting plate 20. Head element wiring 25a (head element wiring part) corresponding to head electrode terminal 31 is arranged and they were connected together with the solder ball.

In FIG. 6, part of first bending part 32a and second bending part 32b are formed on first outrigger 22a and second outrigger 22b which are disposed on both sides of slider supporting plate 20. Further, first and second bending parts 32a and 32b are disposed in such a manner that the intersection point of right-and-left first and second bending parts 32a and 32b in their extending directions coincides with support projection 21. With the action of first bending part 32a and second bending part 32b disposed at the central position of first outrigger 22a and second outrigger 22b, slider supporting plate 20 rotates around support projection 21.

Counter balance 33 is disposed on slider supporting plate 20 in such a manner that the inertial axis of the rotating part which contains slider 3 in Yaw direction and support projection 21 coincide. In addition, T shaped limiter part 34 is arranged on slider supporting part 20 to lift slider 3 when slider 3 is unloaded from disk and also is engaged into hole part 35 formed in load beam 14. During the usual operation, T shaped limiter part 34 does not contact hole part 35 with a gap formed therebetween.

Head element wiring 25a (head element wiring part) is arranged to surround slider 3, and its end is connected to head electrode terminal 31 of slider 3. First outrigger 22a and second outrigger 22b are bonded to head element wiring 25a (head element wiring part) (part C-C in FIG. 6). Similarly, head element wiring 25a (head element wiring part) are bonded to first driving rib 36a and second driving rib 36b which extend from slider supporting plate 20 (part F-F in FIG. 6).

First driving means 16a and second driving means 16b are driven when the voltage is applied to first, second, third and fourth electrode pads 29a, 29b, 29c and 29d. Driving wiring 37a (driving element wiring part) is disposed to input the voltage into first electrode pad 29a in first driving means 16a and fourth electrode pad 29d in second driving means 16b. Second electrode pad 29b and third electrode pad 29c are grounded to flexure board 24 through ground wiring 37b. As such, if the alternating driving signals are input into driving wiring 37a, first driving means 16a and second driving means 16b expand and contract with their movement directions being opposite to each other.

In FIG. 7, first link part 39a is arranged as the first displacement transferring part. First link part 39a is disposed between first joint 40a and second joint 40b to connect these two joints, wherein flexure board 24 in flexure 15 is not removed by etching so flexure board 24 is contained in the configuration. First joint 40a and second joint 40b comprise head element wiring 25a (head element wiring part) where flexure board 24 of flexure 15 is removed by etching and thus have the configuration without flexure board 24. First joint 40a and second joint 40b are flexible (with low flexural rigidity) compared to first link 39a. When first driving means 16a expands and contracts, first link part 39a rotates in a micro scale around second joint 40b. First link part 39a functions to transfer the driving force from first driving means 16a to slider supporting plate 20. Similarly, second link part 39b is arranged as the second displacement transferring part. Second link part 39b is disposed between third joint 40c and fourth joint 40d to connect these two joints. Since third and fourth joints 40c and 40d have the same configuration as first and second joints 40a and 40b, second link part 39b rotates in a micro scale around fourth joint 40d when second driving means 16b expands and contracts. Second link part 39b functions to transfer the driving force from second driving means 16b to slider supporting plate 20.

Base plate 13 or load beam 14 in head assembly 2 is axisymmetrical around the central axis parallel to in Y-axis direction in each figure. Similarly, the first displacement transferring part (i.e., first link part 39a) and the second displacement transferring part (i.e., second link part 39b) are axisymmetrical around the central axis parallel to in Y-axis direction in each figure. The same applied to first joint 40a and second joint 40b and third joint 40c and fourth joint 40d, first driving means 16a and second driving means 16b, and the like.

In FIG. 6 and FIG. 7, first separation groove 44a is arranged to separate first driving means 16a from second joint 40b and flexure board 24. First separation groove 44a is formed along the lengthwise direction (Y-axis direction) of thin film piezoelectric 26 within its length scope. With first separation groove 44a, the displacement of thin film piezoelectric 26 is set free from second joint 40b and flexure board 24 so that the displacement can be maximized, wherein second joint 40 contains head element wiring 25a (head element wiring part). Further, head assembly 2 has a shape that is axisymmetrical around the symmetry axis parallel to Y-axis, and the same applied to second separation groove 44b according to FIG. 6.

Figure 8A:
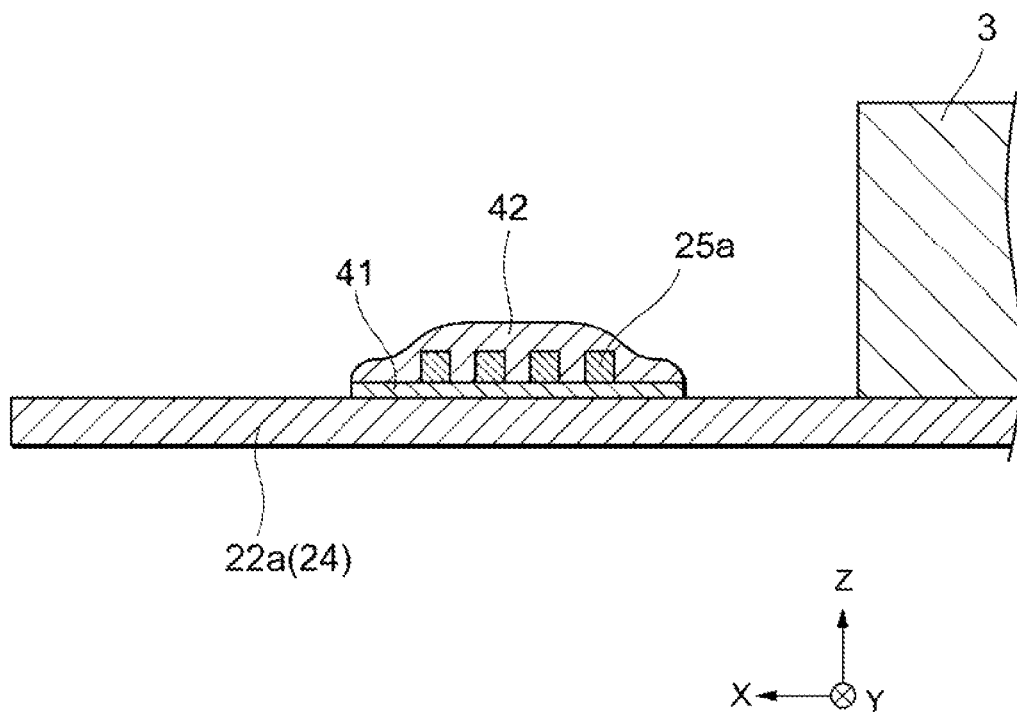
FIG. 8a shows the cross-section taken along C-C line in FIG. 6.
Figure 8B:
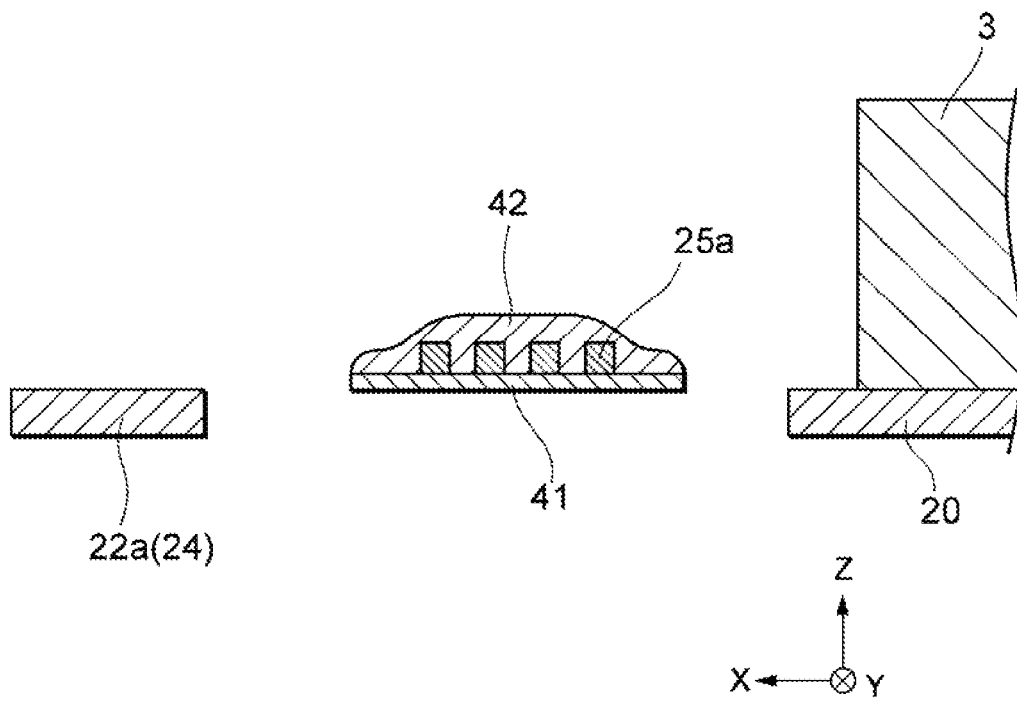
FIG. 8b shows the cross-section taken along D-D line in FIG. 6.
Figure 8C:
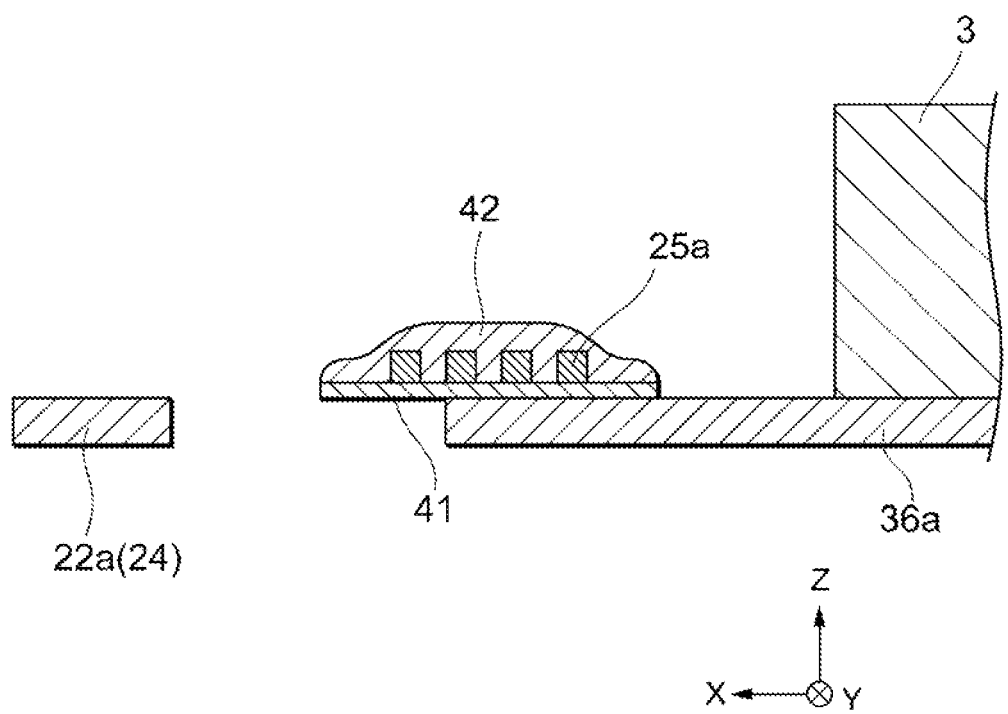
FIG. 8c shows the cross-section taken along F-F line in FIG. 6.

With respect to flexure 15, insulating layer 41 made of polyimide or the like is formed on the stainless steel material with a thickness of 18 μm, and head element wirings 25a are disposed on insulating layer 41 by processing conductor foil 25 with etching. In addition, head element wirings 25a are covered by wire cover 42 made of polyimide or the like for the purpose of insulation or protection. In flexure 15, flexure board 24 made of stainless steel is processed by etching to provide optional shapes so as to ensure necessary mechanical functions. For each cross-section, FIG. 8a to FIG. 8c show the configuration of flexure 15 as shown in FIG. 6 (FIG. 7). FIG. 8a is a cross-sectional view showing the cross-section taken along C-C line in FIG. 6. FIG. 8b is a cross-sectional view showing the cross-section taken along D-D line in FIG. 6. FIG. 8c is a cross-sectional view showing the cross-section taken along F-F line in FIG. 6. According to FIG. 8a, first outrigger 22a comprises flexure board 24 and connected to slider supporting plate 20. Insulating layer 41 is disposed on part of first outrigger 22a, and head element wiring 25a is formed on insulating layer 41 by using conductor foil 25. Further, the wire cover 42 is formed to cover head element wiring 25a. According to FIG. 8b, the part of flexure board 24 on the rear side of head element wiring 25a is removed by etching so that slider supporting plate 20, first outrigger 22a and head element wiring 25a are separated from each other. According to FIG. 8c, first driving rib 36a which is flexure board 24 extending from slider supporting plate 20 is fixed together with part of head element wiring 25a while first outrigger 22a is separated from head element wiring 25a.

Figure 9A:
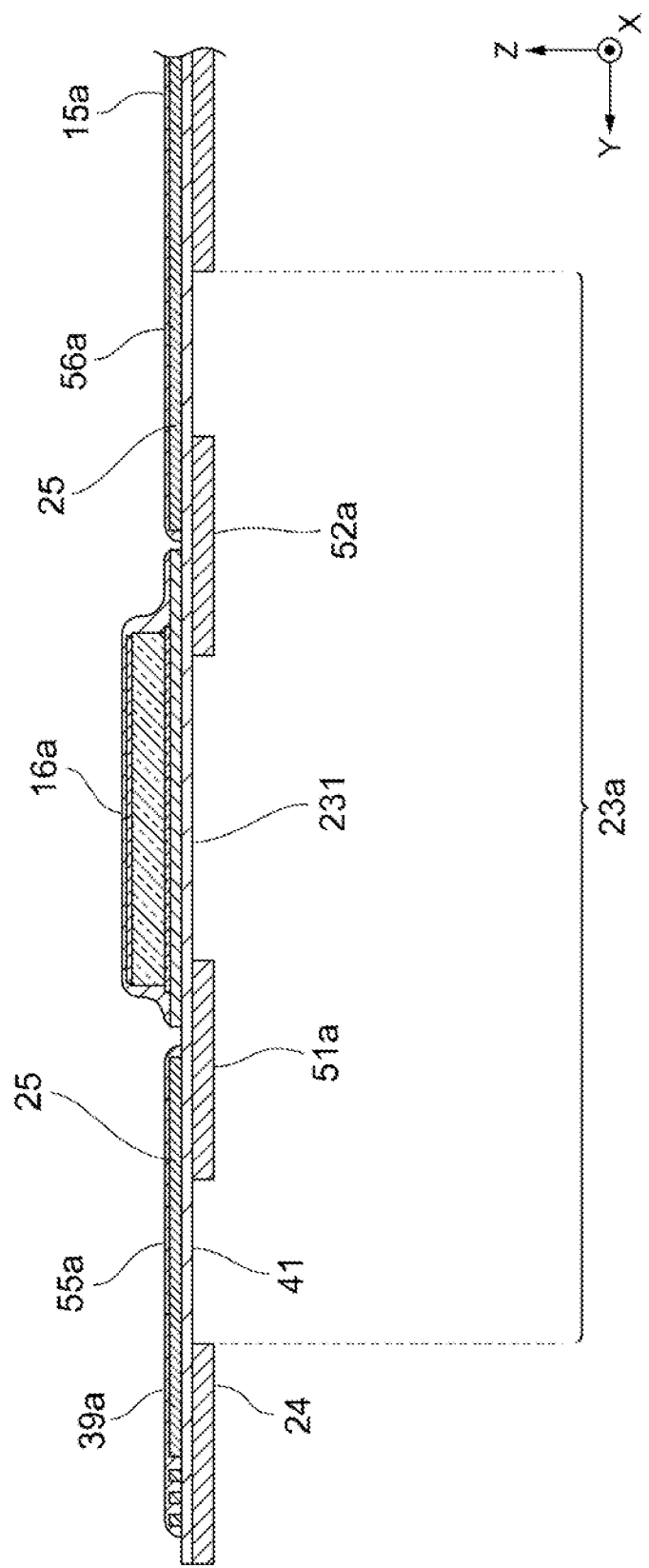
FIG. 9a is a cross-sectional view of the head assembly according to a preferable embodiment of the present invention where the part of the first driving means bonded to the flexure is enlarged.

FIG. 9a is a cross-sectional view (cross-section taken along E-E line in FIG. 6) showing the head assembly according to a preferable embodiment of the present invention where the part of the first driving means bonded to the flexure is enlarged. First driving means 16a is bonded on first driving element-supporting part 23a. First driving element-supporting part 23a is provided with main supporting part 231, first reinforcing part 51a, second reinforcing part 52a, first buffering part 55a, and second buffering part 56a. Main supporting part 231 is located right under first driving means 16a and is composed of insulating layer 41 only. Main supporting part 231 forms the main part of first driving element-supporting part 23a, with which first driving means 16a is bonded. First reinforcing part 51a is disposed under first driving means 16a at the front end side of the head assembly (the side where slider 3 is located) and supports part of one end of first driving means 16a. In other words, first driving means 16a is bonded to main supporting part 231 in such a manner that first driving means 16a and first reinforcing part 51a overlap at the head assembly's front end side. In this way, the displacement of thin film piezoelectric 26 in first driving means 16a can be reliably transferred to first reinforcing part 51a. First reinforcing part 51a is formed by using a part of flexure board 24 and comprises flexure board 24, insulating layer 41 and conductor foil 25. Second reinforcing part 52a is disposed under first driving means 16a at the rear end side of the head assembly (the side where base plate 13 is located) and supports part of the other end of first driving means 16a. In other words, first driving means 16a is bonded to main supporting part 231 in such a manner that first driving means 16a and second reinforcing part 52a overlap at the head assembly's rear end side. Second reinforcing part 52a is formed by using a part of flexure board 24 in flexure 15 and comprises flexure board 24, insulating layer 41 and conductor foil 25. Thus arranged first and second reinforcing parts 51a and 52a are located at both ends of first driving means 16a. More specifically, when viewed in the vertical direction, the end of first driving means 16a at the head assembly's front end side is located in such a manner that this end, main supporting part 231 and first reinforcing part 51a overlap, and the end of first driving means 16a at the head assembly's rear end side is located in such a manner that this end, main supporting part 231 and second reinforcing part 52a overlap. First buffering part 55a is disposed between the first displacement transferring part and first reinforcing part 51a, wherein the first displacement transferring part comprises first link part 39a. One end of first buffering part 55a is connected to first link part 39a, and the other end is connected to first reinforcing part 51a. That is, first buffering part 55a is disposed closer to the front end side of the head assembly than first reinforcing part 51a and connects first reinforcing part 51a with first link part 39a. First buffering part 55a is formed by etching to remove flexure board 24 in flexure 15 and thus comprises insulating layer 41 and conductor foil 25. Here, first link part 39a is formed by keeping flexure board 24 of flexure 15 and thus comprises flexure board 24, insulating layer 41 and head element wiring 25a of conductor foil 25. As such, first buffering part 55a has a lower flexural rigidity than first reinforcing part 51a and first displacement transferring part that comprises first link part 39a.

Second buffering part 56a is disposed between main part of flexure 15a and second reinforcing part 52a with one end connected to main part of flexure 15a and the other end connected to second reinforcing part 52a. That is, second buffering part 56a is disposed closer to the rear end side of the head assembly than second reinforcing part 52a and connects second reinforcing part 52a with main part of flexure 15a. Second buffering part 56a is formed by etching to remove flexure board 24 of flexure 15 and thus comprises insulating layer 41 and conductor foil 25. Here, main part of flexure 15a is formed by keeping flexure board 24 of flexure 15 and thus comprises flexure board 24, insulating layer 41, and driving wiring 37a and ground wiring 37b (driving element wiring) which two are conductor foil 25. As such, second buffering part 56a has a lower flexural rigidity than second reinforcing part 52a and main part of flexure 15a.

In the present embodiment, conductor foil 25 in first buffering part 55a and conductor foil 25 in first reinforcing part 51a are formed by extending part of head element wiring 25a (head element wiring part) which is conductor foil 25 of first link part 39a, wherein first link part 39a is the first displacement transferring part. That is, conductor foil 25 in first buffering part 55a comprises head element wiring 25a (head element wiring), wherein head element wiring 25a transmits the signals to head element 7. In addition, flexure board 24 in first link part 39a and flexure board 24 in first reinforcing part 51a function as a reinforcing plate for partially reinforcing head element wiring 25a (head element wiring part). Further, in the present embodiment, conductor foil 25 in second buffering part 56a and conductor foil 25 in second reinforcing part 52a are integratedly formed by driving wiring 37a and ground wiring 37b (driving element wiring part) which two are conductor foil 25 in main part of flexure 15a. That is, conductor foil 25 in second buffering part 56a comprises driving wiring 37a and ground wiring 37b (driving element wiring part) which two transmit the signals to first driving means 16a. In addition, flexure board 24 in main part of flexure 15a and flexure board 24 in second reinforcing part 52a function as a reinforcing plate for partially reinforcing driving wiring 37a and ground wiring 37b (driving element wiring part). Further, with respect to conductor foil 25 in first buffering part 55a and conductor foil 25 in first reinforcing part 51a, at least one can comprise an independent dummy wiring which does not electrically connect with head element wiring 25a. As for conductor foil 25 in second buffering part 56a and conductor foil 25 in second reinforcing part 52a, an independent dummy wiring which does not electrically connect with driving wiring 37a and ground wiring 37b (driving element wiring part) can be additionally disposed in at least one of these conductor foil 25.

In the present embodiment, the length of first buffering part 55a in the direction connecting first reinforcing part 51a and first displacement transferring part which comprises first link part 39a (Y-axis direction as shown in drawings) is equal to the length of second buffering part 56a in the direction connecting second reinforcing part 52a and main part of flexure 15a (Y-axis direction as shown in drawings). That is, the length of first buffering part 55a is the same with the length of second buffering part 56a in the lengthwise direction of thin film piezoelectric 26 in first driving means 16a. Further, in the present embodiment, the spacing distance of first buffering part 55a away from first driving means 16a is equal to the spacing distance of second buffering part 56a away from first driving means 16a, and both of first buffering part 55a and second buffering pat 56a comprise insulating layer 41 and conductor foil 25. That is, first buffering part 55a and second buffering part 56a both have the shape that is symmetrical around the center or central line of first driving means 16a, and they have the same configuration.

Figure 9B:
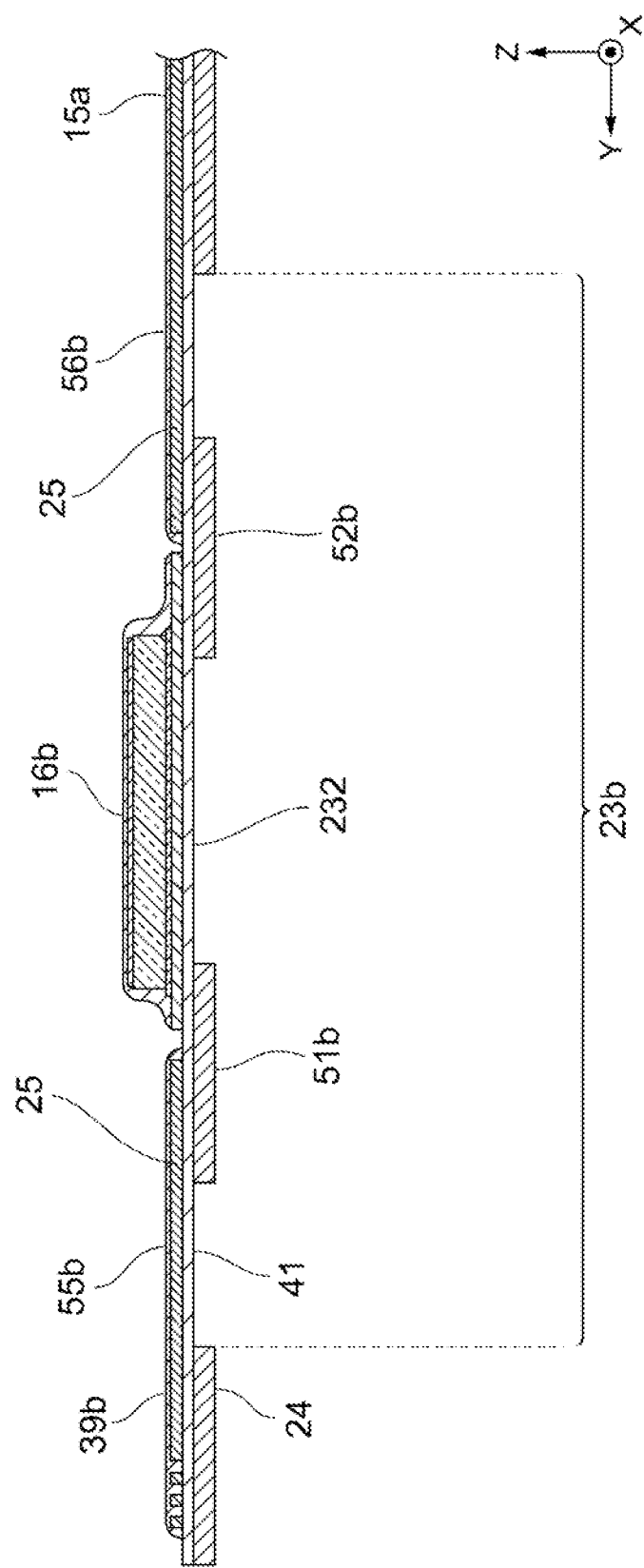
FIG. 9b is a cross-sectional view of the head assembly according to a preferable embodiment of the present invention where the part of the second driving means bonded to the flexure is enlarged.

FIG. 9b is a cross-sectional view showing the head assembly according to a preferable embodiment of the present invention where the part of the second driving means bonded to the flexure is enlarged. Second driving means 16b is bonded on second driving element-supporting part 23b. Second driving means 16b has the same configuration as first driving means 16a, so second driving element-supporting part 23b has the same configuration as first driving element-supporting part 23a. That is, second driving element-supporting part 23b is provided with main supporting part 232, third reinforcing part 51b, fourth reinforcing part 52b, third buffering part 55b, and fourth buffering part 56b. Main supporting part 232 is located right under second driving means 16b and comprises insulating layer 41 only. Main supporting part 232 forms the main part of second driving element-supporting part 23b bonded with second driving means 16b. Third reinforcing part 51b is disposed under second driving means 16b at the front end side of the head assembly (the side where slider 3 is located) and supports part of one end of second driving means 16b. In other words, second driving means 16b is bonded to main supporting part 232 in such a manner that second driving means 16b and third reinforcing part 51b overlap at the head assembly's front end side. In this way, the displacement of thin film piezoelectric 26 in second driving means 16b can be reliably transferred to third reinforcing part 51b. Third reinforcing part 51b is formed by keeping part of flexure board 24 in flexure 15 and comprises flexure board 24, insulating layer 41 and conductor foil 25. Fourth reinforcing part 52b is disposed under second driving means 16b at the rear end side of the head assembly (the side where base plate 13 is located) and supports part of the other end of second driving means 16b. In other words, second driving means 16b is bonded to main supporting part 232 in such a manner that second driving means 16b and fourth reinforcing part 52b overlap at the head assembly's rear end side. Fourth reinforcing part 52b is formed by keeping part of flexure board 24 in flexure 15 and comprises flexure board 24, insulating layer 41 and conductor foil 25. Thus arranged third and fourth reinforcing parts 51b and 52b are located at both ends of second driving means 16b. More specifically, when viewed in the vertical direction, the end of second driving means 16b at the head assembly's front end side is located in such a manner that this end, main supporting part 232 and third reinforcing part 51b overlap, and the end of second driving means 16b at the head assembly's rear end side is located in such a manner that this end, main supporting part 232 and fourth reinforcing part 52b overlap. Third buffering part 55b is disposed between third reinforcing part 51b and the second displacement transferring part, wherein the second displacement transferring part comprises second link part 39b. One end of third buffering part 55b is connected to second link part 39b, and the other end is connected to third reinforcing part 51b. That is, third buffering part 55b is disposed closer to the front end side of the head assembly than third reinforcing part 51b and connects third reinforcing part 51b with second link part 39b. Third buffering part 55b is formed by etching to remove flexure board 24 in flexure 15 and thus comprises insulating layer 41 and conductor foil 25. Here, second link part 39b is formed by keeping flexure board 24 of flexure 15 and thus comprises flexure board 24, insulating layer 41 and head element wiring 25a of conductor foil 25, wherein second link part 39b is the second displacement transferring part. As such, third buffering part 55b has a lower flexural rigidity than third reinforcing part 51b and the second displacement transferring part that comprises second link part 39b.

Fourth buffering part 56b is disposed between main part of flexure 15a and fourth reinforcing part 52b with one end connected to main part of flexure 15a and the other end connected to fourth reinforcing part 52b. That is, fourth buffering part 56b is disposed closer to the rear end side of the head assembly than fourth reinforcing part 52b and connects fourth reinforcing part 52b with main part of flexure 15a. Fourth buffering part 56b is formed by etching to remove flexure board 24 of flexure 15 and thus comprises insulating layer 41 and conductor foil 25. Here, main part of flexure 15a is formed by keeping flexure board 24 of flexure 15 and thus comprises flexure board 24, insulating layer 41, and driving wiring 37a and ground wiring 37b (driving element wiring) which two are conductor foil 25. As such, fourth buffering part 56b has a lower flexural rigidity than fourth reinforcing part 52b and main part of flexure 15a.

In the present embodiment, conductor foil 25 in third buffering part 55b and conductor foil 25 in third reinforcing part 51b are formed by extending part of head element wiring 25a (head element wiring part) which is conductor foil 25 of second link part 39b, wherein second link part 39b is the second displacement transferring part. That is, conductor foil 25 in third buffering part 55b comprises head element wiring 25a (head element wiring), wherein head element wiring 25a transmits the signals to head element 7. In addition, flexure board 24 in second link part 39b and flexure board 24 in third reinforcing part 51b function as a reinforcing plate for partially reinforcing head element wiring 25a. Further, in the present embodiment, conductor foil 25 in fourth buffering part 56b and conductor foil 25 in fourth reinforcing part 52b are integratedly formed by using driving wiring 37a and ground wiring 37b (driving element wiring part) which two are conductor foil 25 in main part of flexure 15a. That is, conductor foil 25 in fourth buffering part 56b comprises driving wiring 37a and ground wiring 37b (driving element wiring part) which two transmit the signals to second driving means 16b. In addition, flexure board 24 in main part of flexure 15a and flexure board 24 in fourth reinforcing part 52b function as a reinforcing plate for partially reinforcing driving wiring 37a and ground wiring 37b (driving element wiring part). Further, with respect to conductor foil 25 in third buffering part 55b and conductor foil 25 in third reinforcing part 51b, at least one can comprise an independent dummy wiring which does not electrically connect with head element wiring 25a. As for conductor foil 25 in fourth buffering part 56b and conductor foil 25 in fourth reinforcing part 52b, an independent dummy wiring which does not electrically connect with driving wiring 37a and ground wiring 37b (driving element wiring part) can be additionally disposed in at least one of these conductor foil 25.

In the present embodiment, the length of third buffering part 55b in the direction connecting third reinforcing part 51b and second displacement transferring part which comprises second link part 39b (Y-axis direction as shown in drawings) is equal to the length of fourth buffering part 56b in the direction connecting fourth reinforcing part 52b and main part of flexure 15a (Y-axis direction as shown in drawings). That is, the length of third buffering part 55b is the same with the length of fourth buffering part 56b in the lengthwise direction of thin film piezoelectric 26 in second driving means 16b. Further, in the present embodiment, third buffering part 55b is away from second driving means 16b in the same spacing distance as fourth buffering part 56b away from second driving means 16b, and both of third buffering part 55b and fourth buffering pat 56b comprise insulating layer 41 and conductor foil 25. That is, third buffering part 55b and fourth buffering part 56b both have the shape that is symmetrical around the center or central line of second driving means 16b, and they have the same configuration.

On the other hand, the first displacement transferring part can also comprise first driving rib 36a. Here, the first displacement transferring part, i.e., driving rib 36a, comprises flexure board 24 extended from part of slider supporting plate 20, insulating layer 41 and conductor foil 25, as shown in FIG. 8c. Here, first joint 40a disposed between first driving rib 36a which is the first displacement transferring part and first reinforcing part 51a can be deemed as first buffering part 55a. In other words, first buffering part 55a is formed by head element wiring 25a (head element wiring part) where flexure board 24 of flexure 15 is removed by etching. Compared to first driving rib 36a which is the first displacement transferring part and first reinforcing part 51a, first joint 40a which is also first buffering part 55a has a structure with a lower flexural rigidity. Similarly, the second displacement transferring part can also comprise second driving rib 36b.

Figure 10:
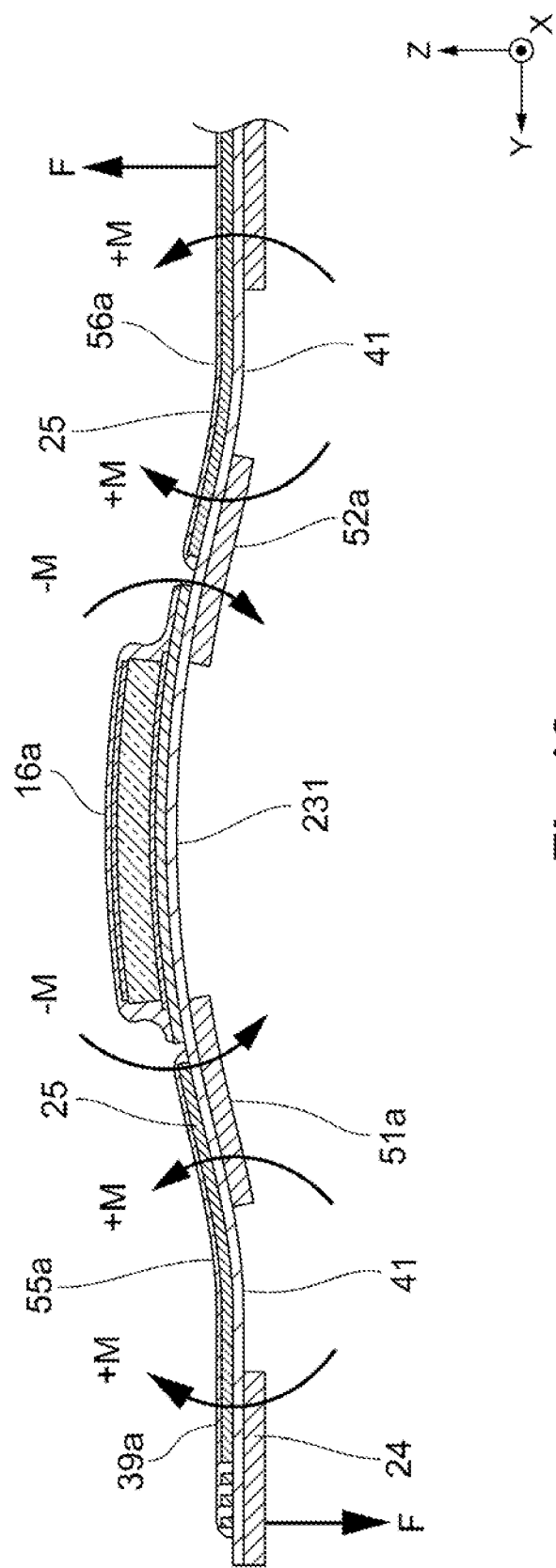
FIG. 10 is a cross-sectional view of the head assembly according to a preferable embodiment of the present invention where the first driving means during the operation is enlarged.

FIG. 10 is a cross-sectional view showing the head assembly according to a preferable embodiment of the present invention, where the first driving means during the operation is enlarged. In FIG. 10, as the operation state of first driving means 16a, the positive voltage is applied to first electrode pad 29a and the negative voltage is applied to second electrode pad 29b. That is, thin film piezoelectric 26 of first driving means 16a is in the state that it expands with the applied voltage. As thin film piezoelectric 26 expands and first driving element-supporting part 23a disposed on the lower side of thin film piezoelectric 26 does not expand, first driving means projects upward (i.e. in a Z-axis positive direction of the drawing) due to the displacement difference and thus, warpage occurs. Here, first reinforcing part 51a and second reinforcing part 52a are fixed integratedly to first driving means 16a, so the displacements occur along the bending part of first driving means 16a.

As described above, first buffering part 55a has a configuration with flexure board 24 removed and is thus flexible in the cross-sectional direction compared to first reinforcing part 51a and the first displacement transferring part comprising first link part 39a which two contain flexure board 24. Thus, the moment produced by the bending of first driving means 16a (-M in FIG. 10) is countered by the moment (M) produced by first buffering part 55a and second buffering part 56a in the opposite direction to provide a balance. First and second buffering parts 55a and 56a have a low flexural rigidity. In this respect, the smaller the flexural rigidity is in first and second buffering parts 55a and 56a, the more the moment M produced in the opposite direction will be eased up and decreased. In addition, when first and second buffering parts 55a and 56a have the same flexural rigidity, the reaction force (F) applied to first link part 39a in the vertical direction will be extremely smaller, wherein first link part 39a is connected to one end of first buffering part 55a. As described above, first link part 39a which is the first displacement transferring part is mechanically connected to slide supporting plate 20, and the slider supporting plate 20 is formed as a pivot in such a manner that slider 3 bonded and fixed on its upper side floats smoothly in response to fluctuation of the disk surface and its lower side contacts at a point with support projection 21 disposed on load beam 14. Thus, displacement or unnecessary vibration in the vertical direction can be reduced by decreasing the reaction force (F) of first link part 39a. Also, the resonance of load beam 14 in Sway mode or the like can be prevented from being excited to decline unnecessary vibration. Further, the resonance of the front end part of flexure 15 which constitutes the rotating part containing slider 3 can be prevented from being excited, and the floating of slider 3 can be stably controlled.

Similarly, when first and second buffering parts 55a and 56a have the same flexural rigidity, the reaction force (F) applied to main part of flexure 15a in the vertical direction will be extremely smaller, wherein main part of flexure 15a is connected to one end of second buffering part 56a. Main part of flexure 15a is part of flexure 15 and is provided with second beam welding point 17b. Main part of flexure 15a is bonded to load beam 14 via second beam welding point 17b. Thus, the resonance of load beam 14 in Sway mode or the like can be prevented from being excited and unnecessary vibration can be reduced by decreasing the reaction force (F) to main part of flexure 15a. On the other hand, when the flexural rigidity of first buffering part 55a is not equal to that of second buffering part 56a, the reaction force (F) is generated in the direction perpendicular to them. Thus, the flexural rigidity is even smaller in first and second buffering parts 55a and 56a, and the reaction force (F) can be decreased to the minimal level when the flexural rigidity is equal in these two parts.

Second driving means 16b, third reinforcing part 51b, third buffering part 55b, second link part 39b which is the second displacement transferring part, fourth reinforcing part 52b and fourth buffering 56b are disposed in such a manner that each of them is symmetrical with the corresponding part as described above around the central line of load beam 14, wherein each of these parts has the same configuration as the corresponding part described above. Although no corresponding figure is provided, as described above, first driving means 16a and second driving means 16b rotate slider 3 as they expand and contract in opposite directions. In this way, during the operation, the direction in which second driving means 16b bends is opposite to that in which first driving means 16a bends. In other words, as first driving means 16a expands and projects to bend at the upper side, second driving means 16b projects to bend at the lower side. The reaction force (F) produced by the bending part of second driving means 16b in the vertical direction and that produced in first driving means 16a are in the opposite directions and are not symmetrical around the central line of head assembly 2. As such, when the reaction force (F) produced by the bending parts of first driving means 16a and second driving means 16b in the vertical direction is decreased, the resonance of load beam 14 in Sway mode, one twist mode, two twists mode or the like can be effectively prevented from being excited. In addition, first link part 39a and second link part 39b are mechanically connected to first driving means 16a and second driving means 16b, respectively, so they displacement in the opposite directions along the bending parts of first driving means 16a and second driving means 16b. That is, the reaction force applied to first link part 39a and the reaction force applied to second link part 39b are in the opposite directions. Thus, when the displacement in or reaction force (F) to first link part 39a which is the first displacement transferring part and the displacement in or reaction force (F) to second link part 39b which is the second displacement transferring part that appear in the vertical direction due to the bending of first driving means 16a and second driving means 16b are eased up with the actions of first buffering part 55a and second buffering part 55b, the resonance of load beam 14 in Sway mode, one twist mode, two twists mode or the like and the resonance of the front end part of flexure 15 which constitutes the rotating part containing slider 3 can be effectively prevented from being excited. Also, the stable control on the floating of slider 3 can be effectively performed.

As described above, in head assembly 2 of the present embodiment, first driving element-supporting 23a is provided with first and second reinforcing parts 51a and 52a disposed at both ends of first driving element 16a; first buffering part 55a connecting first reinforcing part 51a and the first displacement transferring part comprising first link part 39a with its flexural rigidity being lower than those of first reinforcing part 51a and the first displacement transferring part comprising first link part 39a; and second buffering part 56a connecting second reinforcing part 52a and main part of flexure 15a with its flexural rigidity being lower than those of second reinforcing part 52a and main part of flexure 15a. Second driving element-supporting 23b is provided with third and fourth reinforcing parts 51b and 52b disposed at both ends of second driving element 16b; third buffering part 55b connecting third reinforcing part 51b and the second displacement transferring part comprising second link part 39b with its flexural rigidity being lower than those of third reinforcing part 51b and the second displacement transferring part comprising second link part 39b; and fourth buffering part 56b connecting fourth reinforcing part 52b and main part of flexure 15a with its flexural rigidity being lower than those of fourth reinforcing part 52b and main part of flexure 15a. Therefore, the reaction force induced by the warpage of first and second driving means 16a and 16b during the operation in the direction perpendicular to these parts can be reduced by using first to fourth buffering parts 55a, 56a, 55b and 56b with a low flexural rigidity. In this respect, unnecessary resonance can be suppressed by reducing the reaction force in the direction perpendicular to first and second driving means 16a and 16b. In addition, the displacements of first and second driving means 16a and 16b can be transferred in the in-plane direction and the displacement amount of head element 7 can be amplified by reducing the reaction force (F) induced by warpage of first and second driving means 16a and 16b in the direction perpendicular to these parts. As a result, the displacement amount of head element 7 can be effectively obtained.

In addition, in head assembly 2 of the present embodiment, first buffering part 55a and third buffering part 55b comprise head element wiring 25a (head element wiring part) which transmits the signals to head element 7. Second buffering part 56a and fourth buffering part 56b comprise driving element wiring 37a (driving element wiring part) and ground wiring 37b which transmit the signals to first driving element 16a and second driving element 16b. First reinforcing part 51a and the first displacement transferring part comprising first link part 39a as well as third reinforcing part 51b and the second displacement transferring part comprising second link part 39b have the reinforcing plate for partially reinforcing head element wiring 25a (head element wiring part). Second reinforcing part 52a and fourth reinforcing part 52b have the reinforcing plate for partially reinforcing driving wiring 37a (driving element wiring part). Thus, the reaction force induced by the warpage of first and second driving elements 16a and 16b in the direction perpendicular to these parts can be absorbed by first to fourth buffering parts 55a, 56a, 55b and 56b with a low flexural rigidity. When the reaction force induced by the warpage of first and second driving elements 16a and 16b in the direction perpendicular to these parts is decreased, unnecessary resonance can be suppressed and the deformation in the driving elements can be effectively transferred. In this way, the displacement amount of head element 7 can be amplified. Further, as first to fourth buffering parts 55a, 56a, 55b and 56b can be processed and formed during the formation of head wiring 25a (head element wiring part) and driving wiring 37a (driving element wiring part), no new step is needed. Also, unnecessary resonance can be suppressed and the displacement amount of the head element can be amplified.

In the head assembly 2 of the present embodiment, the length of first buffering part 55a in the direction connecting first reinforcing part 51a and the first displacement transferring part comprising first link part 39a is equal to the length of second buffering part 56a in the direction connecting second reinforcing part 52a and main part of flexure 15a, and the length of third buffering part 55b in the direction connecting third reinforcing part 51b and the second displacement transferring part comprising second link part 39b is equal to the length of fourth buffering part 56b in the direction connecting fourth reinforcing part 52b and main part of flexure 15a. Thus, first buffering part 55a, second buffering part 56a, third buffering part 55b and fourth buffering part 56b have the same flexural rigidity. In this respect, the reaction force induced by warpage of first and second driving elements 16a and 16b in the direction perpendicular to these parts can be decreased. Therefore, unnecessary resonance can be further suppressed and the displacement amount of head element 7 can be further amplified.

In head assembly 2 of the present embodiment, first buffering part 55a and second buffering part 56a have the same configuration and have the shape showing the point symmetry around the center of first driving element 16a or the line symmetry around the central line of first driving element 16a, and third buffering part 55b and fourth buffering part 56b have the same configuration and have the shape showing the point symmetry around the center of second driving element 16b or the line symmetry around the central line of second driving element 16b. Thus, the reaction force induced by to the warpage of first and second driving elements 16a and 16b in the direction perpendicular to these parts is divided and applied equally to the first and second displacement transferring parts comprising first and second link parts 39a and 39b and also main part of flexure 15a, and the reaction force can be effectively decreased. Thus, the unnecessary resonance can be further suppressed and the displacement amount of head element 7 can be further amplified.

Hereinafter, according to the present embodiment, the decrease of the reaction force due to warpage during the operation and the suppression on unnecessary resonance which result in effectively obtaining of the displacement amount of the head element will be described in detail based on Example 1 and Comparative Example 1, wherein the warpage is induced by the bending of the thin film piezoelectric element. Head assembly 2 of the present embodiment was used as Example 1. In Example 1, the length L1 in each of first to fourth buffering parts 55a, 56a, 55b and 56b in the lengthwise direction of thin film piezoelectric 26 (Y-axis direction as shown in FIG. 9) was set as 0.145 mm. First to fourth buffering parts 55a, 56a, 55b and 56b comprised insulating layer 41, conductor foil 25 and the wiring cover 42 while first to fourth reinforcing parts 51a, 52a, 51b and 52b, first link part 39a which was the first displacement transferring part, second link part 39b which was the second displacement transferring part, and main part of flexure 15a comprised flexure board 24, insulating layer 41, conductor foil 25 and the wiring cover 42. The width of insulating layer 41 in each of first and second buffering parts 55a and 56a and first and second reinforcing parts 51a and 52a (X-axis direction as shown in FIG. 9) was the same with that of main supporting part 231 in first driving element-supporting part 23a which was bonded to and keeps first driving means 16a, and the width of conductor 25 was the same with that of thin film piezoelectric 26 which constituted first driving means 16a. Similarly, the width of insulating layer 41 in each of third and fourth buffering parts 55b and 56b and third and fourth reinforcing parts 51b and 52b (X-axis direction as shown in FIG. 9) was the same with that of main supporting part 232 in second driving element-supporting part 23b which was bonded to and keeps second driving means 16b, and the width of conductor 25 was the same with that of thin film piezoelectric 26 which constitutes second driving means 16b. In addition, the width of flexure board 24 in each of first to fourth reinforcing parts 51a, 52a, 51b and 52b was the same with that of insulating layer 41 for constituting each reinforcing part. Further, conductor foil 25 constituting first buffering part 55a and third buffering part 55b was formed by extending part of head element wiring 25a (head element wiring part) without electrically connected to thin film piezoelectric 26. Conductor foil 25 constituting second buffering part 56a and fourth buffering part 56b comprised driving wiring 37a and ground wiring 37b (driving element wiring part).

In Comparative Example 1, for the comparison with Example 1 in terms of some characteristics, a head assembly was used which was almost the same with head assembly 2 of the present embodiment except that flexure board 24 on the lower side of first to fourth buffering parts 55a, 56a, 55b and 56b was not removed by etching but remains there. That is, first to fourth buffering parts 55a, 56a, 55b and 56b all comprsied flexure board 24, conductor foil 25, insulating layer 41 and the wiring cover 42. In other words, the three of first link part 39a which was the first displacement transferring part, first buffering part 55a and first reinforcing part 51a had the same configuration in the cross-section and were formed integratedly, which meant no first buffering part 55a or first reinforcing part 51a was arranged and part of first link part 39a was extended to support first driving means 16a. On the other hand, the three of second reinforcing part 52a, second buffering part 56a and main part of flexure 15a had the same configuration in the cross-section and were formed integratedly, which meant no second reinforcing part 52a or second buffering part 56a was arranged and part of main part of flexure 15a was extended to support first driving means 16a. Similarly, the three of second link part 39b which was the second displacement transferring part, third buffering part 55b and third reinforcing part 51b had the same configuration in the cross-section and were formed integratedly, which meant no third buffering part 55b or third reinforcing part 51b was arranged and part of second link part 39b was extended to support second driving means 16b. On the other hand, the three of fourth reinforcing part 52b, fourth buffering part 56b and main part of flexure 15a had the same configuration in the cross-section and were formed integratedly, which meant no fourth reinforcing part 52b or fourth buffering part 56b was arranged and part of main part of flexure 15a was extended to support second driving means 16b.

Figure 11:
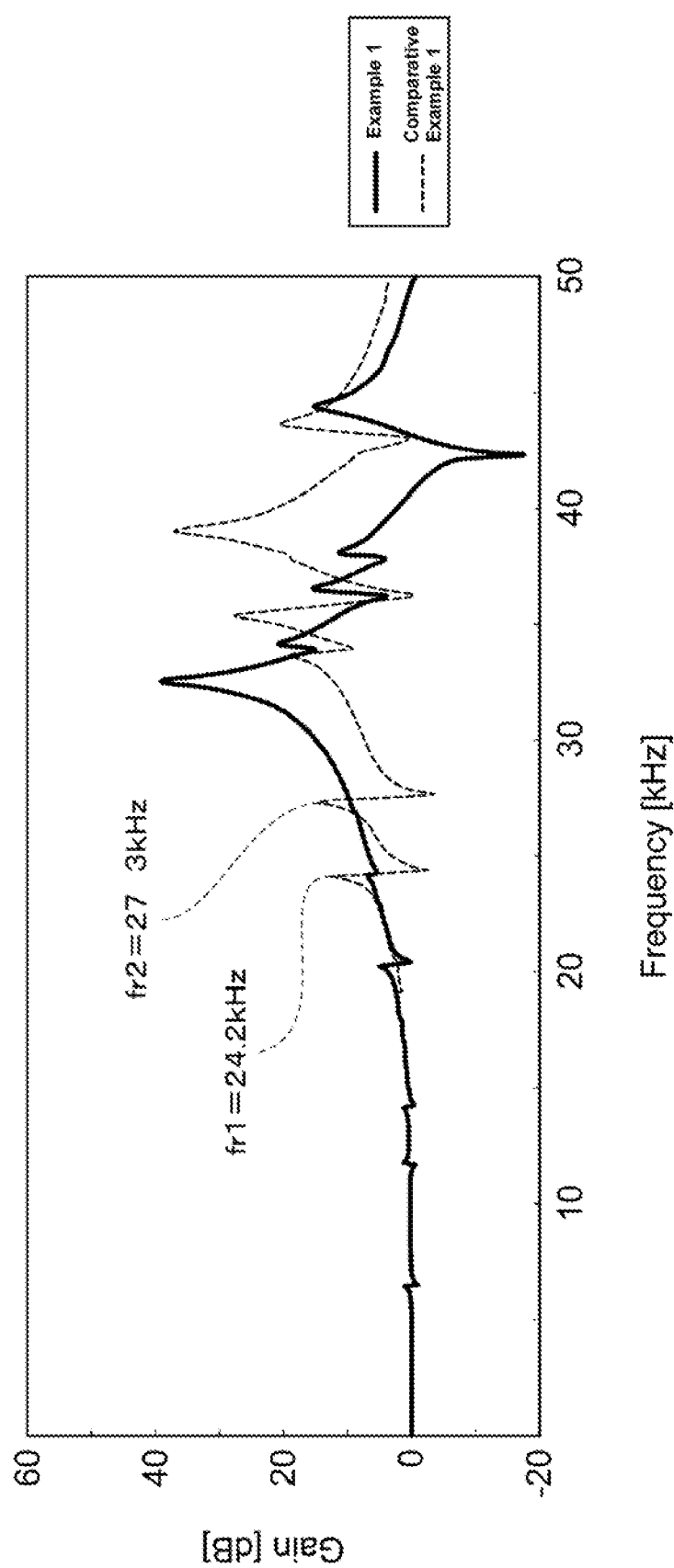
FIG. 11 is a diagram showing the frequency response characteristics of the first and second driving means during the operation in the head assembly of Example 1 and that in Comparative Example 1.

FIG. 11 is a diagram showing the frequency response characteristic of the first and second driving means during the operation in the head assembly of Example 1 and that of Comparative Example 1. The reaction force generated when slider 3 is displaced in a micro scale by first and second driving means 16a and 16b excites the resonance of load beam 14 at its resonance frequency, and resonance point fr1 appears in FIG. 11 which is determined by Sway mode of load beam 14. In addition, fr2 as shown in FIG. 11 is one of the resonance points of slider 3 in Yaw direction. Here, when the position of head element 7 is adjusted in a micro scale by rotating and driving slider 3 with first and second driving means 16a and 16b, the gain for the resonance peak value is preferred to be low. In Comparative Example 1, the peak value at resonance point fr1 which was determined by Sway mode appeared around 24.2 kHz and the gain was approximately 13 dB. The peak value at fr2 which was one of the resonance points of slider 3 in Yaw direction appeared around 27.3 kHz and the gain was approximately 13 dB. However, it can be seen from Example 1 that no peak value showed at fr1 or fr2 and the resonance had been suppressed. In other words, it was indicated in Example 1 that the resonance excited by load beam 14 in Sway mode during the operation of first and second driving means 16a and 16b and the resonance occurred at the front end part of flexure 15 which constituted the rotating part containing slider 3 and slider supporting plate 20 had been suppressed to a great extent by first to fourth buffering parts 55a, 56a, 55b and 56b.

Here, when a voltage of ±1.0 V was applied as the driving signal, the displacement amount x1 of head element 7 in the direction perpendicular to central axis of head assembly 2 (X-axis direction as shown in FIG. 2) was 5.9 [nm/V] in Example 1. The displacement amount of head element was 5.4 [nm/V] in Comparative Example 1. In view of above, it was confirmed that, since first and third buffering parts 55a and 55b had a lower flexural rigidity than first and second link parts 39a and 39b (i.e. the first and second displacement transferring parts, respectively) and also than first and third reinforcing parts 51a and 51b, first and second buffering parts 55a and 55b deformed to absorb the reaction force induced by the bending of first and second driving means 16a and 16b, and thus, the force generated from the extension and contractibility of first and second driving means 16a and 16b worked effectively on head assembly 2 in the in-plane direction, so that the displacement amount of the head element was amplified.

DESCRIPTION OF REFERENCE NUMERALS 1 magnetic disk device
2 head assembly
3 slider
4 housing
5 axis of spindle motor
6 magnetic disk
7 head element
8 supporting arm
9 horizontal rotating axis of VCM
10 magnet part
11 ramp mechanism
12 tab
13 base plate
14 load beam
15 flexure
15a main part of flexure
16a first driving means (thin film piezoelectric element)
16b second driving means (thin film piezoelectric element)
17a first beam welding point
17b second beam welding point
18 blade spring
19 bend processing part
20 slider supporting plate
21 support projection
22a first outrigger
22b second outrigger
23a first driving element -supporting part
23b second driving element-supporting part
231 main supporting part (first driving means)
232 main supporting part (second driving means)
24 flexure board
25 conductor foil
25a head element wiring
26 thin film piezoelectric
27a upper electrode
27b lower electrode
28 base
29a first electrode pad
29b second electrode pad
29c third electrode pad
29d fourth electrode pad
30 insulating cover
31 head electrode terminal
32a first bending part
32b second bending part
33 counter balance
34 T shaped limiter part
35 hole part of load beam
36a first driving rib
36b second driving rib
37a driving wiring
37b ground wiring
39a first link
39b second link
40a first joint
40b second joint
40c third joint
40d fourth joint
41 insulating layer
42 wire covering layer
44a first separation groove
44b second separation groove
51a first reinforcing part
51b third reinforcing part
52a second reinforcing part
52b fourth reinforcing part
55a first buffering part
55b third buffering part
56a second buffering part
56b fourth buffering part

What is claimed is:

1. A head assembly comprising
a slider supporting plate which is formed in a flexure and on which a slider having a head element is supported rotatably around a support projection arranged on the front end part of a load beam;
a first driving element and a second driving element for providing the slider supporting plate with a rotary force along its plane;
a first displacement transferring part for transferring the driving force from the first driving element to the slider supporting plate;
a second displacement transferring part for transferring the driving force from the second driving element to the slider supporting plate;
a first driving element-supporting part for supporting the first driving element;
a second driving element-supporting part for supporting the second driving element,
wherein the first driving element-supporting part comprises a first reinforcing part and a second reinforcing part disposed at both ends of the first driving element; a first buffering part connecting the first reinforcing part and the first displacement transferring part with a flexural rigidity lower than those of the first reinforcing part and the first displacement transferring part; and a second buffering part connecting the second reinforcing part and the main part of the flexure with a flexural rigidity lower than those of the second reinforcing part and the main part of the flexure, and
the second driving element-supporting part comprises a third reinforcing part and a fourth reinforcing part disposed at both ends of the second driving element; a third buffering part connecting the third reinforcing part and the second displacement transferring part with a flexural rigidity lower than those of the third reinforcing part and the second displacement transferring part; and a fourth buffering part connecting the fourth reinforcing part and the main part of the flexure with a flexural rigidity lower than those of the fourth reinforcing part and the main part of the flexure.

2. The head assembly according to claim 1, wherein,
the first buffering part and the third buffering part each comprises a head element wiring part which transmits signals to the head element,
the second buffering part and the fourth buffering part each comprises a driving element wiring part which transmits signals to the first driving element and the second driving element, the first displacement transferring part and the first reinforcing part, and the second displacement transferring part and the third reinforcing part each comprises a reinforcing plate for partially reinforcing the head element wiring part, and the second reinforcing part and the fourth reinforcing part each comprises a reinforcing plate for partially reinforcing the driving element wiring part.

3. The head assembly according to claim 1, wherein, the length of the first buffering part in the direction connecting the first reinforcing part and the first displacement transferring part is equal to the length of the second buffering part in the direction connecting the second reinforcing part and the main part of the flexure, and the length of the third buffering part in the direction connecting the third reinforcing part and the second displacement transferring part is equal to the length of the fourth buffering part in the direction connecting the fourth reinforcing part and the main part of the flexure.

4. The head assembly according to claim 1, wherein, the first buffering part and the second buffering part have the same configuration and have the shape showing the point symmetry around the center of the first driving element or the line symmetry around the central line of the first driving element, and the third buffering part and the fourth buffering part have the same configuration and have the shape showing the point symmetry around the center of the second driving element or the line symmetry around the central line of the second driving element.

5. A magnetic disk device comprising the head assembly according to claim 1.

6. The head assembly according to claim 2, wherein, the length of the first buffering part in the direction connecting the first reinforcing part and the first displacement transferring part is equal to the length of the second buffering part in the direction connecting the second reinforcing part and the main part of the flexure, and the length of the third buffering part in the direction connecting the third reinforcing part and the second displacement transferring part is equal to the length of the fourth buffering part in the direction connecting the fourth reinforcing part and the main part of the flexure.

7. The head assembly according to claim 2, wherein, the first buffering part and the second buffering part have the same configuration and have the shape showing the point symmetry around the center of the first driving element or the line symmetry around the central line of the first driving element, and the third buffering part and the fourth buffering part have the same configuration and have the shape showing the point symmetry around the center of the second driving element or the line symmetry around the central line of the second driving element.

8. The head assembly according to claim 3, wherein, the first buffering part and the second buffering part have the same configuration and have the shape showing the point symmetry around the center of the first driving element or the line symmetry around the central line of the first driving element, and the third buffering part and the fourth buffering part have the same configuration and have the shape showing the point symmetry around the center of the second driving element or the line symmetry around the central line of the second driving element.

9. The head assembly according to claim 6, wherein, the first buffering part and the second buffering part have the same configuration and have the shape showing the point symmetry around the center of the first driving element or the line symmetry around the central line of the first driving element, and the third buffering part and the fourth buffering part have the same configuration and have the shape showing the point symmetry around the center of the second driving element or the line symmetry around the central line of the second driving element.

10. A magnetic disk device comprising the head assembly according to claim 2.

11. A magnetic disk device comprising the head assembly according to claim 3.

12. A magnetic disk device comprising the head assembly according to claim 4.

13. A magnetic disk device comprising the head assembly according to claim 6.

14. A magnetic disk device comprising the head assembly according to claim 7.

15. A magnetic disk device comprising the head assembly according to claim 8.

16. A magnetic disk device comprising the head assembly according to claim 9.

* * * * *